United States Patent
Zhang et al.

(10) Patent No.: US 11,330,636 B2
(45) Date of Patent: *May 10, 2022

(54) MESSAGE 1 OF A TWO-STEP RANDOM ACCESS PROCEDURE

(71) Applicant: QUALCOMM Incorporated, San Diego, CA (US)

(72) Inventors: Xiaoxia Zhang, San Diego, CA (US); Srinivas Yerramalli, San Diego, CA (US); Jing Sun, San Diego, CA (US); Aleksandar Damnjanovic, Del Mar, CA (US); Ozcan Ozturk, San Diego, CA (US); Tao Luo, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,271

(22) Filed: Apr. 21, 2020

(65) Prior Publication Data

US 2020/0252977 A1 Aug. 6, 2020

Related U.S. Application Data

(63) Continuation of application No. 16/582,357, filed on Sep. 25, 2019.

(Continued)

(51) Int. Cl.
*H04W 74/08* (2009.01)
*H04L 27/26* (2006.01)
(Continued)

(52) U.S. Cl.
CPC ....... *H04W 74/0833* (2013.01); *H04L 5/0048* (2013.01); *H04L 27/2605* (2013.01);
(Continued)

(58) Field of Classification Search
None
See application file for complete search history.

(56) References Cited

U.S. PATENT DOCUMENTS

2012/0236737 A1* 9/2012 Bergman .......... H04W 74/0833
370/252
2012/0263214 A1* 10/2012 Lee ......................... H04J 13/14
375/219

(Continued)

FOREIGN PATENT DOCUMENTS

WO WO-2018175809 A1 9/2018

OTHER PUBLICATIONS

International Search Report and Written Opinion—PCT/US2019/053281—ISA/EPO—dated Dec. 17, 2019.

(Continued)

*Primary Examiner* — Mohammad S Adhami
(74) *Attorney, Agent, or Firm* — Holland & Hart LLP

(57) ABSTRACT

Methods, systems, and devices for wireless communications are described. A user equipment (UE) may identify that the UE is configured to use a two-step random access channel (RACH) procedure. The two-step RACH procedure may include an uplink request message and a downlink response. The UE may transmit the uplink request message as part of the two-step RACH procedure, and the uplink request message may include a preamble portion that is one of a set of predefined sequences and a payload portion that includes a physical uplink shared channel waveform. The UE may receive the downlink response as part of the two-step RACH procedure and in response to the uplink request message.

31 Claims, 18 Drawing Sheets

Related U.S. Application Data

(60) Provisional application No. 62/740,937, filed on Oct. 3, 2018.

(51) Int. Cl.
    *H04L 5/00* (2006.01)
    *H04W 72/04* (2009.01)
    *H04W 36/00* (2009.01)
    *H04W 56/00* (2009.01)

(52) U.S. Cl.
    CPC ..... *H04L 27/2649* (2013.01); *H04W 72/0446* (2013.01); *H04W 36/0005* (2013.01); *H04W 56/001* (2013.01)

(56) References Cited

U.S. PATENT DOCUMENTS

| | | | |
|---|---|---|---|
| 2018/0205516 A1 | 7/2018 | Jung et al. | |
| 2019/0320467 A1* | 10/2019 | Freda | H04W 74/0833 |
| 2019/0373642 A1 | 12/2019 | Suzuki et al. | |
| 2019/0387548 A1* | 12/2019 | Kim | H04W 72/0406 |
| 2020/0015276 A1* | 1/2020 | Reial | H04W 74/0833 |
| 2020/0100299 A1* | 3/2020 | Loehr | H04W 76/11 |
| 2020/0107322 A1* | 4/2020 | Lunttila | H04W 74/0833 |
| 2020/0112994 A1* | 4/2020 | Zhang | H04L 27/2649 |
| 2021/0021333 A1 | 1/2021 | Kusashima et al. | |

OTHER PUBLICATIONS

Mediatek Inc: "On 2-Step Random Access procedure and Physical Channel in NR", 3GPP Draft; R1-1700172 On_2-Step_Random_Access_procedure_and_Physical_Channel_in_NR_Final, 3rd Generation Partnership Project (3GPP), Mobile Competence Centre ; 650, Route Des Lucioles; F-06921 Sophia-Antipolis Cedex; France, vol. Ran WG1, No. Spokane, USA; Jan. 16, 2017-Jan. 20, 2017 Jan. 16, 2017, XP051207712, Retrieved from the Internet:URL:http://www.3gpp.org/ftp/Meetings_3GPP_SYNC/RAN1/Docs/ [retrieved on Jan. 16, 2017], 7 pages.

Motorola Mobility: "Physical Channel Design for 2-step RACH", 3GPP Draft; R1-1800727 Physical Channel Design for 2-step RACH V0, 3rd Generation Partnership Project (3GPP), Mobile Competence Centre ; 650, Route Des Lucioles; F-06921 Sophia-Antipolis Cedex; France, vol. RAN WG1, No. Vancouver, Canada; Jan. 22, 2018-Jan. 26, 2018 Jan. 13, 2018, XP051385042, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 4 pages.

* cited by examiner

Preamble Resource Elements

Payload Resource Elements

MESSAGE 1 OF A TWO-STEP RANDOM ACCESS PROCEDURE

CROSS REFERENCE

The present Application for Patent is a Continuation of U.S. patent application Ser. No. 16/582,357 by ZHANG, et al. entitled "MESSAGE 1 OF A TWO-STEP RANDOM ACCESS PROCEDURE," filed Sep. 25, 2019, which claims the benefit of U.S. Provisional Patent Application No. 62/740,937 by ZHANG, et al., entitled "MESSAGE 1 OF A TWO-STEP RANDOM ACCESS PROCEDURE," filed Oct. 3, 2018, assigned to the assignee hereof, and expressly incorporated herein.

BACKGROUND

The following relates generally to wireless communications, and more specifically to methods and techniques for configuring and transmitting a first message, or message 1, of a two-step random access procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless systems may support random access procedures for establishing communications between a UE and a base station. The random access procedure may involve a series of handshake messages between the UE and the base station. In some cases, it may be desirable to reduce the latency associated with the random access procedure.

SUMMARY

The described techniques relate to improved methods, systems, devices, and apparatuses that support message 1 of a two-step random access procedure. Generally, the described techniques provide for performing a two-step random access procedure based on an access request message (message 1) from a UE that includes a preamble portion and a payload portion. In some instances, the preamble of the access request message may serve as a demodulation reference signal for a payload portion of the access request message. In some cases, the payload portion of the access request message may be a physical uplink control channel waveform or a physical uplink shared channel waveform. The size of the payload portion of the access request message may be fixed or may be a function of a random access procedure use case.

A method of wireless communication at a UE is described. The method may include identifying that the UE is configured to use a two-step random access channel (RACH) procedure, the two-step RACH procedure including an uplink request message and a downlink response, transmitting the uplink request message as part of the two-step RACH procedure, the uplink request message including a preamble portion that is one of a plurality of predefined sequences and a payload portion that includes a waveform of a physical uplink shared channel, where the preamble portion is associated with a transmission occasion of the physical uplink shared channel, and receiving the downlink response as part of the two-step RACH procedure and in response to the uplink request message.

An apparatus for wireless communication at a UE is described. The apparatus may include a processor, memory in electronic communication with the processor, and instructions stored in the memory. The instructions may be executable by the processor to cause the apparatus to identify that the UE is configured to use a two-step RACH procedure, the two-step RACH procedure including an uplink request message and a downlink response, transmit the uplink request message as part of the two-step RACH procedure, the uplink request message including a preamble portion that is one of a plurality of predefined sequences and a payload portion that includes a waveform of a physical uplink shared channel, where the preamble portion is associated with a transmission occasion of the physical uplink shared channel, and receive the downlink response as part of the two-step RACH procedure and in response to the uplink request message.

Another apparatus for wireless communication at a UE is described. The apparatus may include means for identifying that the UE is configured to use a two-step RACH procedure, the two-step RACH procedure including an uplink request message and a downlink response, means for transmitting the uplink request message as part of the two-step RACH procedure, the uplink request message including a preamble portion that is one of a plurality of predefined sequences and a payload portion that includes a waveform of a physical uplink shared channel, where the preamble portion is associated with a transmission occasion of the physical uplink shared channel, and means for receiving the downlink response as part of the two-step RACH procedure and in response to the uplink request message.

A non-transitory computer-readable medium storing code for wireless communication at a UE is described. The code may include instructions executable by a processor to identify that the UE is configured to use a two-step RACH procedure, the two-step RACH procedure including an uplink request message and a downlink response, transmit the uplink request message as part of the two-step RACH procedure, the uplink request message including a preamble portion that is one of a plurality of predefined sequences and a payload portion that that includes a waveform of a physical uplink shared channel, where the preamble portion is associated with a transmission occasion of the physical uplink shared channel, and receive the downlink response as part of the two-step RACH procedure and in response to the uplink request message.

Some examples of the method, apparatuses, and non-transitory computer-readable medium described herein may further include operations, features, means, or instructions for receiving an indication of the preamble portion before transmitting the uplink request message.

In some examples of the method, apparatuses, and non-transitory computer-readable medium described herein, transmitting the uplink request message may include transmitting the preamble portion of the uplink request message as a demodulation reference signal for the payload portion of the uplink request message. In some examples of the method, apparatuses, and non-transitory computer-readable medium described herein, transmitting the uplink request message may also include transmitting additional demodulation reference signals for the payload portion of the uplink request message.

In some examples of the method, apparatuses, and non-transitory computer-readable medium described herein, transmitting the uplink request message may include transmitting the preamble portion of the uplink request message using a preamble sequence that has a prime number sequence length, and transmitting the payload portion using resource elements that are a subset of a frequency span of the preamble portion.

In some examples of the method, apparatuses, and non-transitory computer-readable medium described herein, transmitting the uplink request message may include transmitting the payload portion using a payload size that is based, at least in part, on whether the two-step RACH procedure is for initial access or for handover. In some examples of the method, apparatuses, and non-transitory computer-readable medium described herein, transmitting the uplink request message may include transmitting the payload portion using a fixed payload size.

In some examples of the method, apparatuses, and non-transitory computer-readable medium described herein, transmitting the uplink request message may include transmitting the preamble portion of the uplink request message back-to-back with the payload portion of the uplink request message, each resource element of the preamble portion and each resource element of the payload portion having a cyclic prefix. In some examples of the method, apparatuses, and non-transitory computer-readable medium described herein, the cyclic prefix of the resource elements of the preamble portion of the uplink request message is different from the cyclic prefix of the resource elements of the payload portion of the uplink request message.

In some examples of the method, apparatuses, and non-transitory computer-readable medium described herein, transmitting the uplink request message may include transmitting the preamble portion of the uplink request message interleaved in time with the payload portion of the uplink request message, each resource element of the preamble portion and each resource element of the payload portion having a cyclic prefix. In some examples of the method, apparatuses, and non-transitory computer-readable medium described herein, the cyclic prefix of the resource elements of the preamble portion of the uplink request message is different from the cyclic prefix of the resource elements of the payload portion of the uplink request message.

In some examples of the method, apparatuses, and non-transitory computer-readable medium described herein, transmitting the uplink request message may include transmitting the preamble portion of the uplink request message back-to-back with the payload portion of the uplink request message without use of cyclic prefixes between resource elements of the preamble portion.

Some examples of the method, apparatuses, and non-transitory computer-readable medium described herein may further include operations, features, means, or instructions for receiving, via remaining minimum system information or radio resource control signaling, an association between the preamble portion of the uplink request message and the payload portion of the uplink request message.

In some examples of the method, apparatuses, and non-transitory computer-readable medium described herein, transmitting the uplink request message may include transmitting the preamble portion of the uplink request message during a first transmission time interval, and transmitting, in accordance with the received association, the payload portion of the uplink request message during a second transmission time interval. In some examples of the method, apparatuses, and non-transitory computer-readable medium described herein, transmitting the uplink request message may also include transmitting the preamble portion of the uplink request message and the payload portion of the uplink request message without an intervening transmission time interval between the first transmission time interval and the second transmission time interval. In some examples of the method, apparatuses, and non-transitory computer-readable medium described herein, transmitting the uplink request message may also include transmitting the preamble portion of the uplink request message and the payload portion of the uplink request message with an intervening transmission time interval between the first transmission time interval and the second transmission time interval, wherein the intervening transmission time interval is available for non-RACH transmissions.

Some examples of the method, apparatuses, and non-transitory computer-readable medium described herein may further include operations, features, means, or instructions for selecting a preamble sequence from the plurality of predefined sequences for transmission of the preamble portion of the uplink request message, wherein only a portion of the predefined sequences are associated with two-step RACH procedures.

In some examples of the method, apparatuses, and non-transitory computer-readable medium described herein, transmitting the uplink request message may include transmitting the payload portion of the uplink request message with an embedded demodulation reference signal to match dimensions of both the preamble portion and the payload portion.

In some examples of the method, apparatuses, and non-transitory computer-readable medium described herein, transmitting the uplink request message may include selecting a preamble sequence from the plurality of predefined sequences for transmission of the preamble portion of the uplink request message, wherein the selected preamble sequence shares a resource association with another preamble sequence of the plurality of predefined sequences, and applying an additional differentiating factor to the uplink request message to allow differentiation of the payload portion of the uplink request message. In some examples of the method, apparatuses, and non-transitory computer-readable medium described herein, the additional differentiating factor is one or more of use of different demodulation reference signal ports or use of different scrambling identifications.

Some examples of the method, apparatuses, and non-transitory computer-readable medium described herein may further include operations, features, means, or instructions for selecting a preamble sequence from the plurality of predefined sequences for transmission of the preamble portion of the uplink request message, wherein the selected preamble sequence has a resource association with more than one payload resource, and applying an additional identifying factor to the uplink request message to allow identification of the payload portion of the uplink request message. In some examples of the method, apparatuses, and non-transitory computer-readable medium described herein, the additional identifying factor is one or more of use of different demodulation reference signal ports or use of different scrambling identifications.

In some examples of the method, apparatuses, and non-transitory computer-readable medium described herein, transmitting the uplink request message may include transmitting the payload portion during a time resource that is time-multiplexed with payload portions from additional UEs. In some examples of the method, apparatuses, and non-transitory computer-readable medium described herein, transmitting the uplink request message may include transmitting the payload portion during a time resource that is code division-multiplexed with payload portions from additional UEs.

A method of wireless communication at a base station is described. The method may include receiving, as part of a two-step RACH procedure, an uplink request message from a UE, the uplink request message including a preamble portion that is one of a plurality of predefined sequences and a payload portion that includes a waveform of a physical uplink shared channel, where the preamble portion is associated with a transmission occasion of the physical uplink shared channel, and transmitting a downlink response as part of the two-step RACH procedure and in response to the uplink request message.

An apparatus for wireless communication at a base station is described. The apparatus may include a processor, memory in electronic communication with the processor, and instructions stored in the memory. The instructions may be executable by the processor to cause the apparatus to receive, as part of a two-step RACH procedure, an uplink request message from a UE, the uplink request message including a preamble portion that is one of a plurality of predefined sequences and a payload portion includes a waveform of a physical uplink shared channel, where the preamble portion is associated with a transmission occasion of the physical uplink shared channel, and transmit a downlink response as part of the two-step RACH procedure and in response to the uplink request message.

Another apparatus for wireless communication at a base station is described. The apparatus may include means for receiving, as part of a two-step RACH procedure, an uplink request message from a UE, the uplink request message including a preamble portion that is one of a plurality of predefined sequences and a payload portion that includes a waveform of a physical uplink shared channel, where the preamble portion is associated with a transmission occasion of the physical uplink shared channel, and means for transmitting a downlink response as part of the two-step RACH procedure and in response to the uplink request message.

A non-transitory computer-readable medium storing code for wireless communication at a base station is described. The code may include instructions executable by a processor to receive, as part of a two-step RACH procedure, an uplink request message from a UE, the uplink request message including a preamble portion that is one of a plurality of predefined sequences and a payload portion that includes a waveform of a physical uplink shared channel, where the preamble portion is associated with a transmission occasion of the physical uplink shared channel, and transmit a downlink response as part of the two-step RACH procedure and in response to the uplink request message.

Some examples of the method, apparatuses, and non-transitory computer-readable medium described herein may further include operations, features, means, or instructions for transmitting an indication of the preamble portion to the UE before receiving the uplink request message.

In some examples of the method, apparatuses, and non-transitory computer-readable medium described herein, receiving the uplink request message may include receiving the preamble portion of the uplink request message, and using the preamble portion of the uplink request message as a demodulation reference signal for the payload portion of the uplink request message. In some examples of the method, apparatuses, and non-transitory computer-readable medium described herein, transmitting the uplink request message may also include receiving additional demodulation reference signals for the payload portion of the uplink request message.

In some examples of the method, apparatuses, and non-transitory computer-readable medium described herein, transmitting the uplink request message may include receiving the preamble portion of the uplink request message using a preamble sequence that has a prime number sequence length, and receiving the payload portion using resource elements that are a subset of a frequency span of the preamble portion.

In some examples of the method, apparatuses, and non-transitory computer-readable medium described herein, transmitting the uplink request message may include receiving the payload portion using a payload size that is based, at least in part, on whether the two-step RACH procedure is for initial access or for handover. In some examples of the method, apparatuses, and non-transitory computer-readable medium described herein, transmitting the uplink request message may include receiving the payload portion using a fixed payload size.

In some examples of the method, apparatuses, and non-transitory computer-readable medium described herein, transmitting the uplink request message may include receiving the preamble portion of the uplink request message back-to-back with the payload portion of the uplink request message, each resource element of the preamble portion and each resource element of the payload portion having a cyclic prefix. In some examples of the method, apparatuses, and non-transitory computer-readable medium described herein, the cyclic prefix of the resource elements of the preamble portion of the uplink request message is different from the cyclic prefix of the resource elements of the payload portion of the uplink request message.

In some examples of the method, apparatuses, and non-transitory computer-readable medium described herein, transmitting the uplink request message may include receiving the preamble portion of the uplink request message interleaved in time with the payload portion of the uplink request message, each resource element of the preamble portion and each resource element of the payload portion having a cyclic prefix. In some examples of the method, apparatuses, and non-transitory computer-readable medium described herein, the cyclic prefix of the resource elements of the preamble portion of the uplink request message is different from the cyclic prefix of the resource elements of the payload portion of the uplink request message.

In some examples of the method, apparatuses, and non-transitory computer-readable medium described herein, transmitting the uplink request message may include receiving the preamble portion of the uplink request message back-to-back with the payload portion of the uplink request message without use of cyclic prefixes between resource elements of the preamble portion.

Some examples of the method, apparatuses, and non-transitory computer-readable medium described herein, transmitting the uplink request message may include transmitting, via remaining minimum system information or radio resource control signaling, an association between the preamble portion of the uplink request message and the payload portion of the uplink request message. In some examples of the method, apparatuses, and non-transitory computer-readable medium described herein, transmitting the uplink request message may include receiving the preamble portion of the uplink request message during a first transmission time interval, and receiving, in accordance with the transmitted association, the payload portion of the uplink request message during a second transmission time interval.

In some examples of the method, apparatuses, and non-transitory computer-readable medium described herein, transmitting the uplink request message may include receiving the preamble portion of the uplink request message and the payload portion of the uplink request message without an intervening transmission time interval between the first transmission time interval and the second transmission time interval. In some examples of the method, apparatuses, and non-transitory computer-readable medium described herein, transmitting the uplink request message may include receiving the preamble portion of the uplink request message and the payload portion of the uplink request message with an intervening transmission time interval between the first transmission time interval and the second transmission time interval, wherein the intervening transmission time interval is available for non-RACH transmissions.

In some examples of the method, apparatuses, and non-transitory computer-readable medium described herein, transmitting the uplink request message may include receiving in the preamble portion a preamble sequence selected from the plurality of predefined sequences, wherein only a portion of the predefined sequences are associated with two-step RACH procedures. In some examples of the method, apparatuses, and non-transitory computer-readable medium described herein, transmitting the uplink request message may include receiving the payload portion of the uplink request message with an embedded demodulation reference signal to match dimensions of both the preamble portion and the payload portion.

In some examples of the method, apparatuses, and non-transitory computer-readable medium described herein, transmitting the uplink request message may include receiving in the preamble portion a preamble sequence selected from the plurality of predefined sequences, wherein the selected preamble sequence shares a resource association with another preamble sequence of the plurality of predefined sequences, and differentiating the payload portion of the uplink request message via a differentiating factor. In some examples of the method, apparatuses, and non-transitory computer-readable medium described herein, the differentiating factor is one or more of use of different demodulation reference signal ports or use of different scrambling identifications.

In some examples of the method, apparatuses, and non-transitory computer-readable medium described herein, transmitting the uplink request message may include receiving in the preamble portion a preamble sequence selected from the plurality of predefined sequences, wherein the selected preamble sequence has a resource association with more than one payload resource, and identifying the payload portion of the uplink request message via an identifying factor. In some examples of the method, apparatuses, and non-transitory computer-readable medium described herein, the identifying factor is one or more of use of different demodulation reference signal ports or use of different scrambling identifications.

In some examples of the method, apparatuses, and non-transitory computer-readable medium described herein, transmitting the uplink request message may include receiving the payload portion during a time resource that is time-multiplexed with payload portions from additional UEs. In some examples of the method, apparatuses, and non-transitory computer-readable medium described herein, transmitting the uplink request message may include receiving the payload portion during a time resource that is code division-multiplexed with payload portions from additional UEs.

In some examples of the method, apparatuses, and non-transitory computer-readable medium described herein, transmitting the uplink request message may include applying the preamble portion of the uplink request message as a demodulation reference signal for the payload portion of the uplink request message, and scheduling non-RACH transmissions based on presence of the preamble portion and application of the preamble portion as a demodulation reference signal.

DETAILED DESCRIPTION

Figure 1:
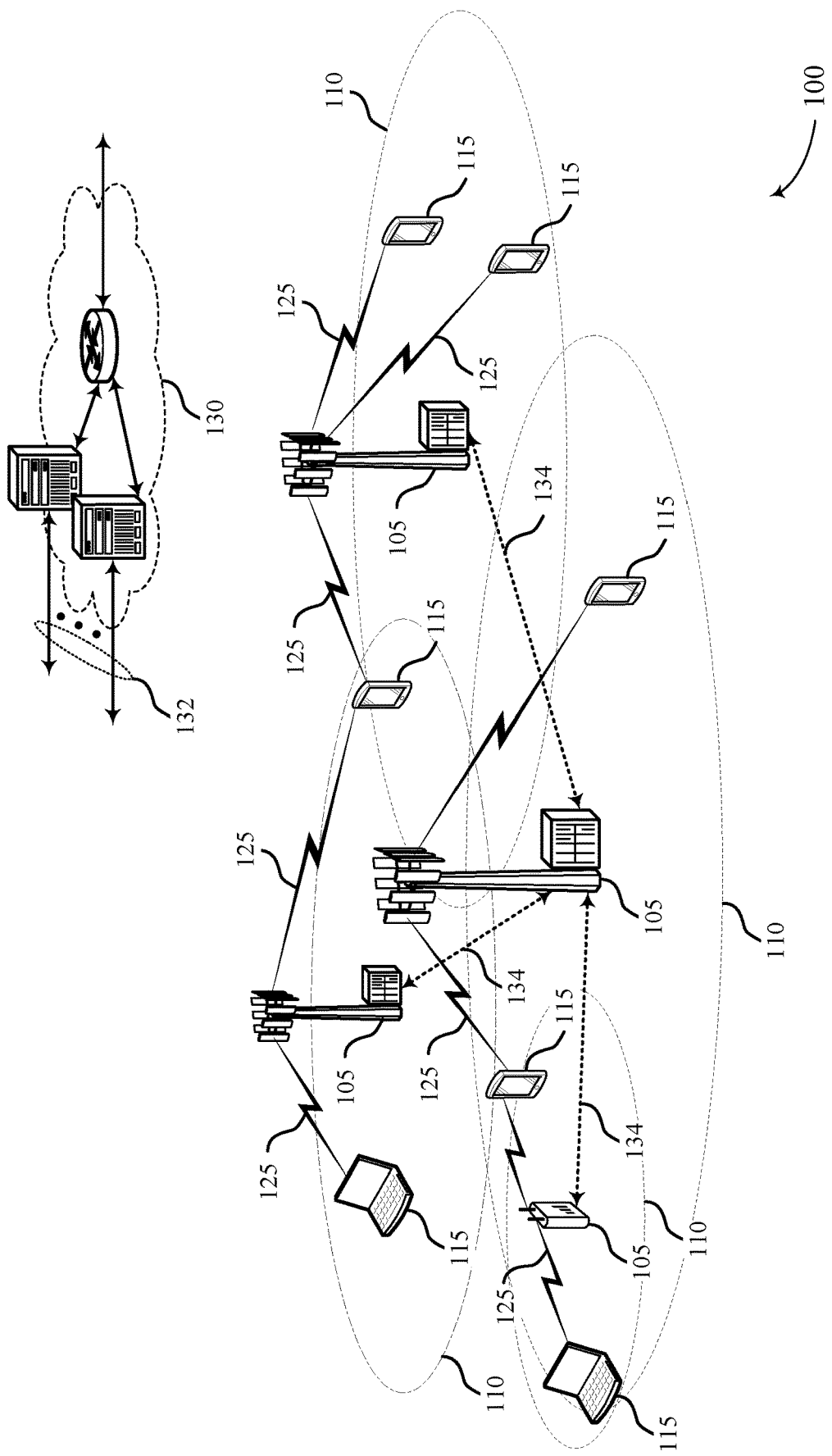
FIG. 1 illustrates an example of a system for wireless communications that supports message 1 of a two-step random access procedure in accordance with aspects of the present disclosure.

Some wireless systems support establishment of communications between a user equipment (UE) and a base station using a random access procedure that may enable a UE to synchronize with the base station. The UE may initiate the random access procedure when it is first powered up (e.g., at initial access), during a handover of the UE from one base station to another base station, when the UE needs to re-establish communications after an interruption, or under various other conditions, for example.

In some cases, a random access procedure may include transmission of a series of four handshake messages between the UE and the base station. Such messages may be unscheduled, for example, and may be transmitted on a shared random access channel (RACH). When the random access procedure is used in an unlicensed spectrum, the UE may perform a listen-before-talk (LBT) procedure before transmitting each message to ensure that the transmission channel is clear for use.

In a four-message random access procedure, the first message may be a message transmitted from the UE to the base station and may include a preamble waveform (e.g., a preamble sequence) that identifies the UE. The second message may be transmitted from the base station to the UE and may acknowledge receipt of the preamble and allocate transmission resources to the UE. The third message may be another message transmitted from the UE to the base station and may include a request for a radio resource control (RRC) connection. The fourth message may be transmitted from the base station to the UE and may include an RRC connection response. Once the fourth message is received and decoded by the UE, the UE may begin communications with the base station in, for example, RRC connected mode. This random access procedure may be referred to as a four-step random access procedure.

In some cases, it may be desirable or beneficial to reduce the latency and/or the number of LBT procedures associated with performing a random access procedure. Such reductions may improve communication efficiency and may be particularly useful for latency-sensitive communications. Thus, new random access procedures may be needed to reduce the latency associated with the random access procedure.

Aspects of the present disclosure may include a two-step random access procedure that includes transmission of a first message (message 1) from the UE to the base station and a second message (message 2) from the base station to the UE. In some cases, these two messages may essentially replace the four messages of a conventional four-step random access procedure. As described herein, in some cases, a UE may be configured to support both the two-step random access procedure and the four-step random access procedure.

In some cases, message 1 of the two-step random access procedure includes a preamble portion and a payload portion (which may be, for example, an RRC connection request or data), thereby combining features of the first message and the third message of a conventional four-step procedure. In some cases, the base station may respond with a downlink response. This downlink response may be referred to as message 2 of the two-step random access procedure.

As described herein, a two-step random access procedure may provide multiple benefits. For example, a two-step random access procedure as described herein may reduce the number of messages required for a random access procedure and may correspondingly, reduce the number of LBT procedures that may be performed by the UE when the UE is operating in an unlicensed spectrum. Such reductions may reduce the latency of the random access procedure. In addition, in some cases, the preamble portion of message 1 may be used as a reference signal for the payload portion of message 1, which may be particularly beneficial in the context of high Doppler operation (such as in vehicle to everything (V2X) systems) when a UE may be moving relatively quickly.

Aspects of the disclosure are initially described in the context of a wireless communications system. Aspects of the disclosure are further described in the context of a process flow. Aspects of the disclosure are further illustrated by and described with reference to message configuration diagrams, apparatus diagrams, system diagrams, and flowcharts that relate to configuring and transmitting message 1 of a two-step random access procedure.

FIG. 1 illustrates an example of a wireless communications system 100 that supports message 1 of a two-step random access procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band (NR-U) such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may perform a random access procedure to synchronize with the network under various circumstances, including at power-up (e.g., for initial access) or at a handover from one base station 105 to another base station 105, for example. The random access procedure may enable the UE 115 to synchronize timing with the base station 105 and receive an allocation of uplink transmission resources. In some cases, a UE 115 may perform a two-step random access procedure. The UE 115 may initiate the procedure by transmitting an uplink request message (message 1) to a base station 105. The uplink request message may include a preamble portion and a payload portion.

In some cases, the UE 115 may transmit the uplink request message to the base station using a transport channel, such as a shared RACH. Thus, the two-step random access procedure may be referred to as a two-step RACH procedure.

In some cases, the preamble portion of message 1 is a sequence, such as a Zadoff-Chu sequence or another type of sequence. In some cases, the sequence may have the property that cyclically shifted versions of the sequence are orthogonal to one another, such that the sequence may be used to reduce cross-correlation (e.g., interference) between transmissions.

In some cases, the preamble sequence (e.g., the sequence selected for the preamble portion) may be randomly selected from a set of predefined sequences. This may enable the base station 105 to distinguish between multiple UEs 115 trying to access the system simultaneously, since RACH is normally contention-based.

In some cases, the preamble portion (e.g., the preamble sequence) may be associated with a transmission occasion of a physical uplink shared channel (PUSCH). For example, the preamble portion may indicate an occasion during which the UE may transmit information to the base station on the PUSCH.

In some cases, the UE may receive an indication of the preamble portion from the base station before transmitting the uplink request message. For example, the base station may select a preamble sequence and may transmit an indication of the preamble sequence to the UE, and the indicated preamble sequence may be included by the UE in the preamble portion of the uplink request message.

In some cases, the payload portion includes either a physical uplink control channel (PUCCH) waveform or a PUSCH waveform. A PUCCH waveform may be used to convey signaling or control information, for example. A PUSCH waveform may be used to convey signaling information, uplink control information (UCI), or user data, for example.

In some cases, the base station 105 may respond to receiving message 1 from the UE 115 by transmitting a downlink response that enables the UE 115 to begin ongoing communication with the base station 105 (e.g., by establishing an RRC connection), thereby completing the two-step RACH procedure.

In some cases, a UE 115 may identify that the UE 115 is configured to use a two-step RACH procedure. The two-step RACH procedure may include an uplink request message and a downlink response. The UE 115 may transmit the uplink request message as part of the two-step RACH procedure. The uplink request message may include a preamble portion that is one of a set of predefined sequences and a payload portion that includes either a PUCCH waveform or a PUSCH waveform, where the preamble portion is associated with a transmission occasion of the PUSCH. The UE 115 may receive the downlink response as part of the two-step RACH procedure and in response to the uplink request message.

In some cases, a base station 105 may receive, as part of a two-step RACH procedure, an uplink request message from a UE. The uplink request message may include a preamble portion that is one of a set of predefined sequences and a payload portion that includes either a PUCCH waveform or a PUSCH waveform, where the preamble portion is associated with a transmission occasion of the PUSCH. The base station 105 may transmit a downlink response as part of the two-step RACH procedure and in response to the uplink request message.

UEs 115 may include a UE communications manager 102, which may identify that the UE 115 is configured to use a two-step RACH procedure. The two-step RACH procedure may include an uplink request message and a downlink response. The UE communications manager 102 may transmit the uplink request message as part of the two-step RACH procedure, the uplink request message including a preamble portion that is one of a set of predefined sequences and a payload portion that includes either a physical uplink control channel waveform or a physical uplink shared channel waveform, where the preamble portion is associated with a transmission occasion of the PUSCH. The UE communications manager 102 may receive the downlink response as part of the two-step RACH procedure and in response to the uplink request message.

One or more of the base stations 105 may include a base station communications manager 101, which may receive, as part of a two-step RACH procedure, an uplink request message from a UE 115. The uplink request message including a preamble portion that is one of a set of predefined sequences and a payload portion that includes either a physical uplink control channel waveform or a physical uplink shared channel waveform, where the preamble portion is associated with a transmission occasion of the PUSCH. The base station communications manager 101 may transmit a downlink response as part of the two-step RACH procedure and in response to the uplink request message.

Figure 2:
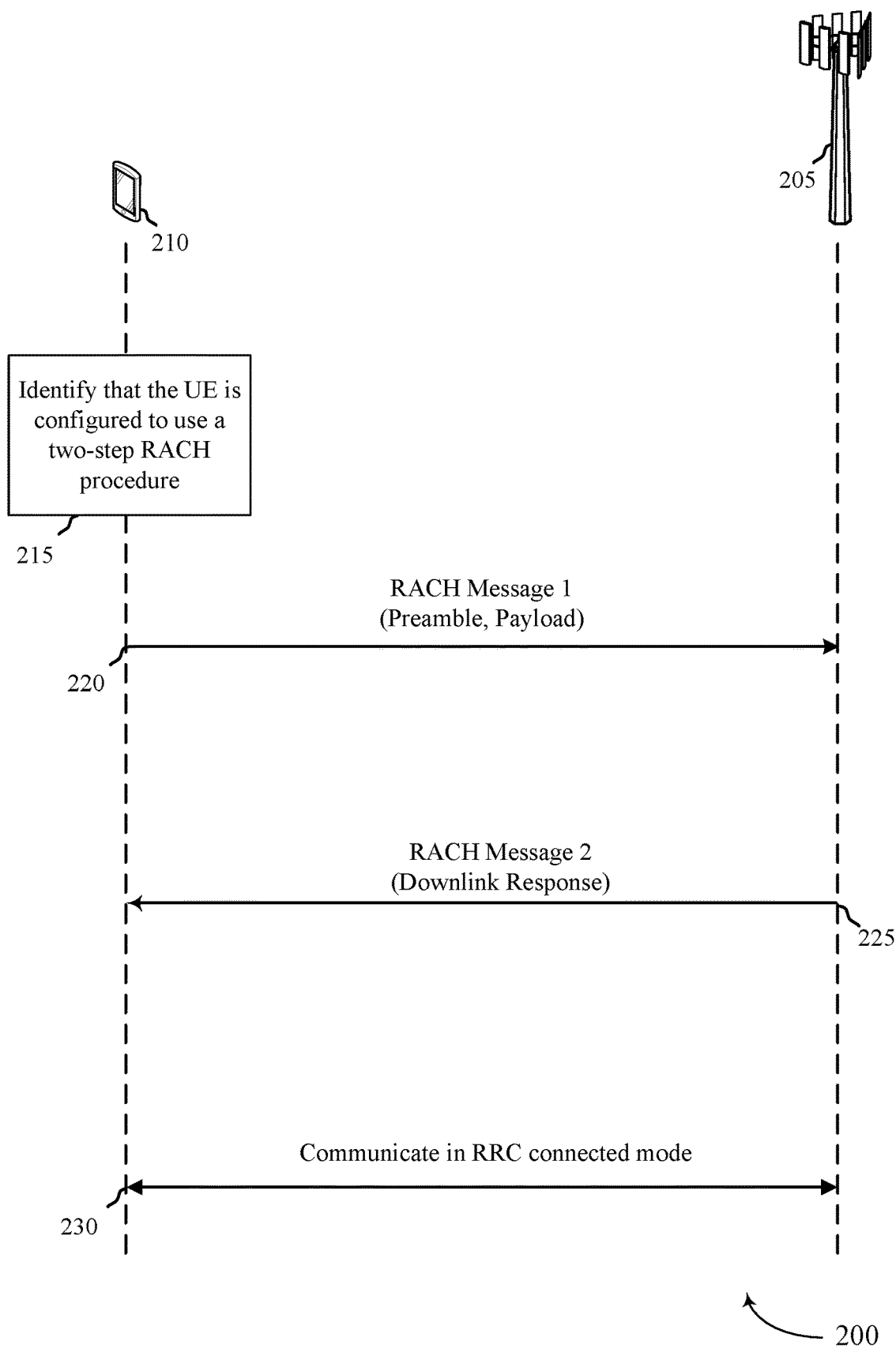
FIG. 2 illustrates an example of a process that supports message 1 of a two-step random access procedure in accordance with aspects of the present disclosure.

FIG. 2 illustrates an example of a process 200 that supports a two-step random access procedure (e.g., a two-step RACH procedure) in accordance with aspects of the present disclosure. In some examples, process 200 may implement aspects of wireless communication system 100. Process 200 may include communications between a base station 205 and a UE 210, which may be examples of the corresponding devices described herein.

At 215, UE 210 may identify that the UE 210 is configured to use a two-step RACH procedure. The UE 210 may identify that the UE 210 is configured to use the two-step RACH procedure based on configuration information previously received by UE 210 or based on a device setting of UE 210, for example.

At 220, UE 210 may transmit an uplink request message as part of the two-step RACH procedure. In some cases, the UE 210 may transmit the uplink request message on the RACH transport channel, for example. In some cases, the uplink request message may include a preamble portion that is one of a set of predefined sequences and a payload portion that includes either a PUCCH waveform or a PUSCH waveform. In some cases, the preamble portion is associated with a transmission occasion of the PUSCH.

At 225, base station 205 may, in response to receiving the uplink request message from UE 210, transmit a downlink response to UE 210 that may be received by UE 210.

At 230, UE 210 may, based on the downlink response message received from base station 205, begin communicating with base station 205. In some cases, UE 210 may begin communicating in RRC connected mode, for example.

Additional details regarding aspects of the uplink request message are described in more detail with reference to FIGS. 3 through 8.

Figure 3:
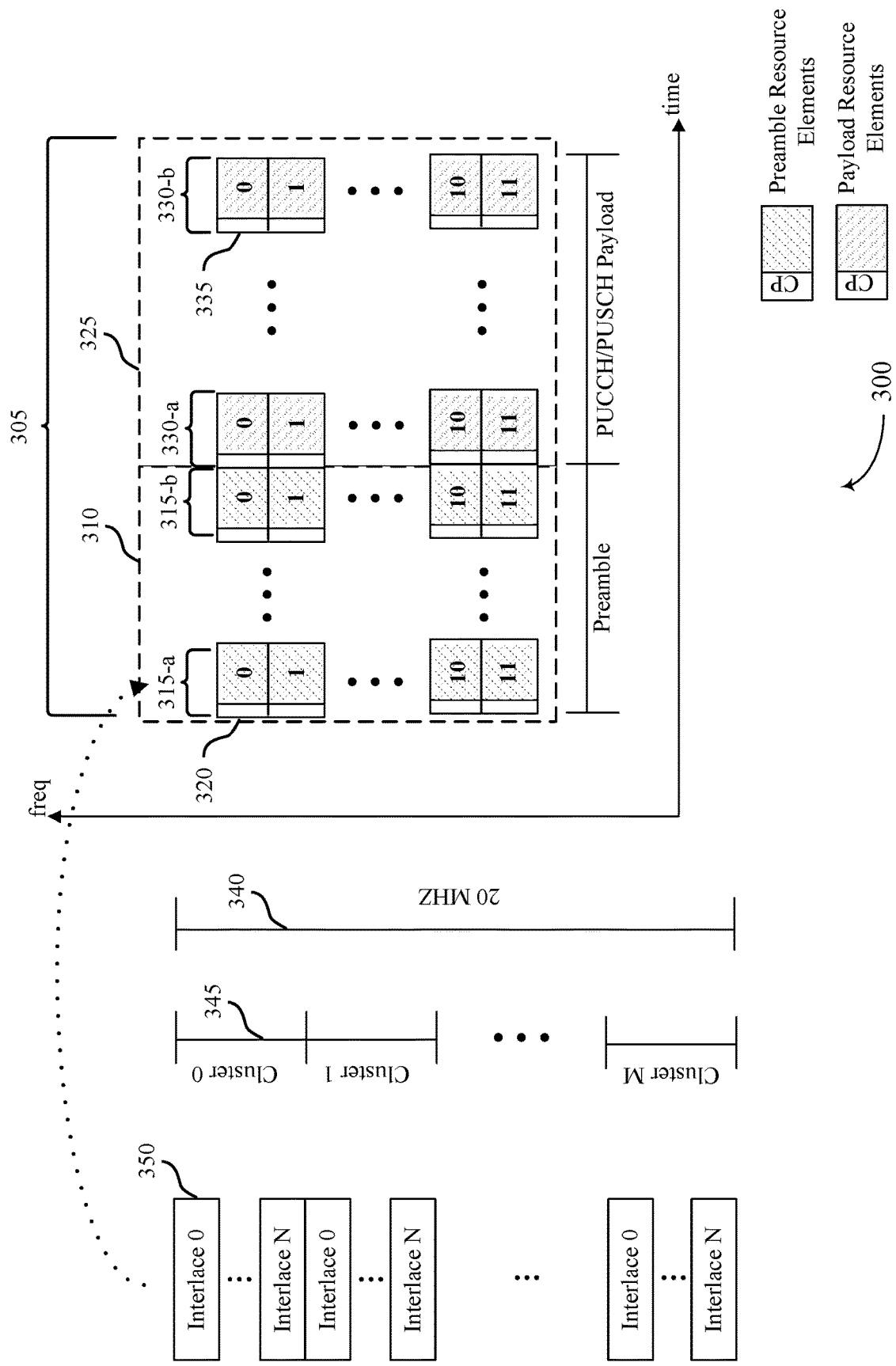
FIG. 3 illustrates an example of a message configuration for message 1 of a two-step random access procedure in accordance with aspects of the present disclosure.

FIG. 3 illustrates an example of a message configuration 300 for an uplink request message of a two-step random access procedure in accordance with aspects of the present disclosure. In some examples, an uplink request message having message configuration 300 may be transmitted using aspects of wireless communication system 100.

Message configuration 300 includes uplink request message 305 that may be transmitted from a UE 210 to a base station 205 as described with respect to FIG. 2. Uplink request message 305 may include a preamble portion 310 and a payload portion 325.

Preamble portion 310 may include one or more preamble resource elements 315-a through 315-b, each of which may include a symbol, such as an OFDM symbol, and a preamble cyclic prefix 320. Preamble cyclic prefixes 320 may serve as guard intervals to reduce inter-symbol interference between preamble resource elements 315, and/or may be used to support channel estimation or equalization. The preamble portion 310 may be associated with a PUCCH or PUSCH occasion (e.g., a transmission occasion during which the UE may transmit information on the PUCCH or PUSCH), for example. Preamble resource elements 315 may be indexed as shown from 0 to 11, for example, if there are twelve preamble resource elements in a frequency band. Other numbers of preamble resource elements are possible.

In some cases, preamble portion 310 is or includes one of a set of predefined sequences, such as Zadoff-Chu sequences or other type of sequences, for example. In some cases, the set of predefined sequences may be a set of 64 Zadoff-Chu sequences, for example. In some cases, the predefined sequence may be known to both the UE 210 and the base station 205. In some cases, preamble portion 310 includes a sequence having a sequence length that is a prime number. In some cases, each of the sequences in the set of predefined sequences have corresponding sequence lengths that are prime numbers. The UE 210 may select the predefined sequence randomly, for example, or using a selection algorithm.

In some cases, base station 205 may transmit an indication of the preamble portion (e.g., a preamble sequence) to UE 210, and UE 210 may select the predefined sequence based on the indication received from the base station 205.

Payload portion 325 includes one or more payload resource elements 330-a through 33-b, each of which may include a symbol, such as an OFDM or DFT-s-OFDM symbol, and a payload cyclic prefix 335. Payload cyclic prefixes 335 may serve as guard intervals to reduce inter-symbol interference between payload resource elements 330, and/or may be used to support channel estimation or equalization.

In some cases, the payload cyclic prefix 335 may be the same as the preamble cyclic prefix 320. For example, the payload cyclic prefix 335 may have the same length as the preamble cyclic prefix 320. In some cases, the payload cyclic prefix 335 may be different than the preamble cyclic prefix 320. For example, the payload cyclic prefix 335 may have a different length than the preamble cyclic prefix 320.

As depicted in FIG. 3, in some cases, the preamble portion 310 and the payload portion 325 are transmitted back-to-back; that is, there may not be a gap between the last preamble resource element and the first payload resource element. In this case, the payload portion 325 may be appended to the preamble portion 310. In some cases, the preamble portion 310 and the payload portion 325 may be transmitted back-to-back on the same resources.

In some cases, the payload portion 325 may be transmitted as a PUCCH waveform or a PUSCH waveform. In some cases, payload portion 325 includes signaling or control information, such as an RRC request (e.g., a request for an RRC connection) for an initial access. The signaling or control information may be transmitted as a PUCCH waveform, for example. In some cases, payload portion 325 includes user data. Such user data may include, for example, data transmitted within a V2X system, such as a user (vehicle) location or speed. In some cases, the user data may be transmitted as a PUCCH or PUSCH waveform, for example. In some cases, the user data may be transmitted in a two-step RACH procedure during a handover, for example.

In some cases, the payload portion 325 may have a fixed payload size (which may include padding). That is, the payload portion 325 may be transmitted using the same fixed payload size regardless of whether the two-step RACH procedure is initiated for an initial access (e.g., on power up), for a handover, or for another reason.

In some cases, the payload portion 325 may have a payload size that is based on whether the two-step RACH procedure is initiated for an initial access or for a handover. For example, the payload portion 325 may be transmitted using a smaller payload size for an initial access (in which the payload may include an RRC connection request) and using a larger payload size for a handover (in which the payload may include user data), or vice versa.

As depicted in FIG. 3, in some cases, uplink request message 305 may be transmitted using interlaces 350. An interlace 350 may be a set of frequency resources used for transmissions over a channel (e.g., PUCCH, PUSCH) to mitigate issues related to power spectral density limitations, for example. An interlace may include M resource block clusters 345 that are evenly spaced across the frequency span 340 (e.g., the system bandwidth available for the transmission), which may be, in this example, 20 MHz. Each resource block cluster 345 may include N interlaces 350. In some cases, an interlace 350 may be associated with transmission of a preamble portion 310.

In other cases, an uplink request message 305 may be transmitted without using interlaces; e.g., using a contiguous preamble format.

In some cases, the preamble portion 305 and payload portion 325 may have aligned resource element boundaries, as depicted in FIG. 3. In this case, an interlaced preamble (e.g., having a cyclic prefix for each sequence transmission) may be reused as a reference signal, such as a demodulation reference signal (DMRS) or other reference signal, for the payload portion 325. Thus, in some cases, the preamble portion 310 of the uplink request message 305 may be transmitted as a DMRS for the payload portion 325 of the uplink request message 305.

In conventional systems, a DMRS for a payload may be have a length that is a multiple of the number of resource elements associated with the payload. Therefore, the length of a DMRS is, in general, not a prime number. However, when the preamble portion 310, which has a sequence length that is a prime number, is used as a DMRS for the payload portion 325, the payload portion 325 may be transmitted using a number of resource elements that is the same prime number as the sequence length to enable the DMRS to be used as a reference signal for the payload portion 325. In this case, this number of resource elements used to transmit the payload portion 325 may be a subset of the frequency span of the preamble portion 310; that is, some resource elements 330-b may not be used. This scenario may be particularly relevant to the case of transmissions using DFT-s-OFDM symbols, for example.

In some cases, a preamble cyclic prefix 320 of a preamble resource element 315 in the preamble portion 310 may include a cyclic prefix extension; e.g., the preamble cyclic prefix 320 may be extended to a larger length or longer time period to enable the preamble portion 310 to be used as a DMRS for payload portion 330.

In some cases, the uplink request message 305 may include one or more additional reference signals (e.g., one or more additional DMRS's or other reference signals) for the payload portion 325, either in addition to or instead of the DMRS transmitted in the preamble portion 310.

In some cases, the preamble portion 310 and payload portion 325 may have different user multiplexing capabilities. For example, the preamble portion 310 may be a PUCCH waveform, which may be designed to carry (e.g., accommodate transmissions from) multiple UEs using, for example, FDM and/or code division multiplexing (CDM). For example, the payload portion 325 may be a PUSCH waveform, which may not be designed to carry multiple UEs. In some cases, it may be possible to spatially separate transmissions from multiple UEs on a PUSCH waveform.

In some cases, the payload portion 325 may be frequency division multiplexed or code division multiplexed across UEs 210.

In some cases, the uplink request message 305 may not include (e.g., may omit) HARQ information if the random access procedure is a contention-based random access procedure (CBRA); e.g., for use in NR-U or another unlicensed spectrum.

Figure 4:
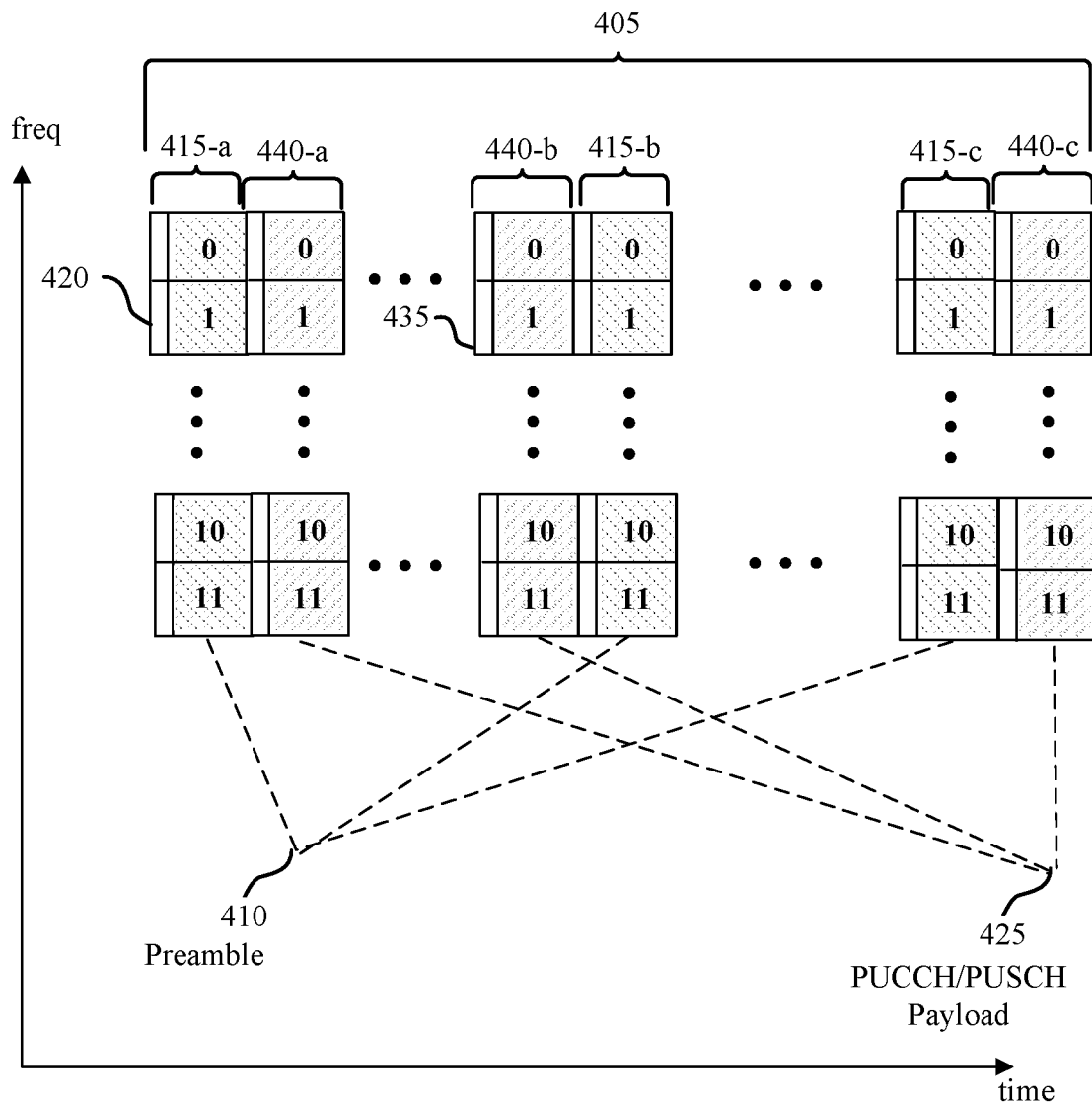
FIG. 4 illustrates an example of a message configuration for message 1 of a two-step random access procedure in accordance with aspects of the present disclosure.
Figure 4:
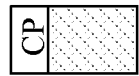
Figure 4:

FIG. 4 illustrates an example of a message configuration 400 for an uplink request message of a two-step random access procedure in accordance with aspects of the present disclosure. In some examples, an uplink request message having message configuration 400 may be transmitted using aspects of wireless communication system 100.

Message configuration 400 includes uplink request message 405, which may be transmitted by a UE 210 to a base station 205 as described with respect to FIG. 2. Uplink request message 405 may include a preamble portion 410 and a payload portion 425. In some cases, the uplink request message 405 may be transmitted using interlaces. In some cases, the uplink request message 405 may be transmitted without using interlaces.

In message configuration 400, preamble resource elements 415 of preamble portion 410 are interleaved in time (e.g., multiplexed in time) with payload resource elements 440 of payload portion 425. In this example, the interleaved preamble resource elements 415 and payload resource elements 440 have resource element boundaries that are aligned in time, and the preamble portion 410 is distributed in time for better detection (e.g., better synchronization) under high Doppler conditions, such as in a V2X system in which UEs 210 may be moving relatively quickly. For example, a first preamble resource element 415-a (e.g., a first preamble resource element spanning a frequency range at a given symbol) may be used as a DMRS for a corresponding first payload resource element 440-a (e.g., for a payload resource element that is adjacent in time to the first preamble resource element), and a second preamble resource element 415-c may be used as a DMRS for a second payload resource element 440-c, etc. In some cases, preamble resource elements 415 may be transmitted back-to-back with payload resource elements 440 (e.g., without a gap between resource elements).

Figure 5:
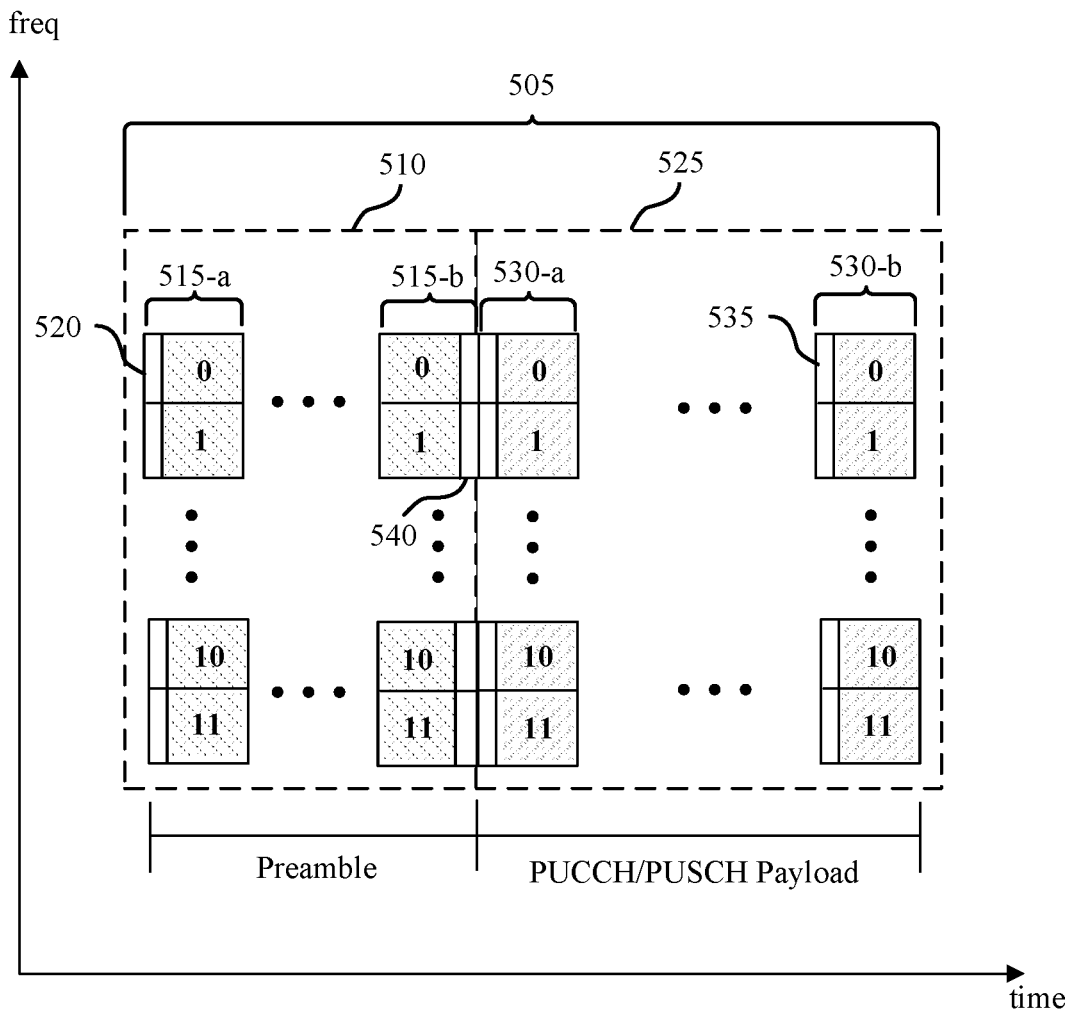
FIG. 5 illustrates an example of a message configuration for message 1 of a two-step random access procedure in accordance with aspects of the present disclosure.

FIG. 5 illustrates an example of a message configuration 500 for an uplink request message of a two-step random access procedure in accordance with aspects of the present disclosure. In some examples, an uplink request message having message configuration 500 may be transmitted using aspects of wireless communication system 100.

Message configuration 500 includes uplink request message 505, which may be transmitted by a UE 210 to a base station 205 as described with respect to FIG. 2. Uplink request message 505 may include a preamble portion 510 and a payload portion 525. In some cases, the uplink request message 505 may be transmitted using interlaces. In some cases, the uplink request message 505 may be transmitted without using interlaces. Preamble portion 510 may include preamble resource elements 515-a through 515-b. Payload portion 525 may include payload resource elements 530-a through 530-b.

In the example of message configuration 500, the preamble portion 510 and the payload portion 525 are transmitted back-to-back; that is, there may not be a gap between the last preamble resource element 515-b and the first payload resource element 530-a. In this case, the payload portion 525 may be appended to the preamble portion 510. In some cases, the preamble portion 510 and the payload portion 525 may be transmitted back-to-back on the same resources.

In some cases, the first preamble resource element 515-a in the preamble portion 510 may include a cyclic prefix 520, and subsequent preamble resource elements 515 may be transmitted without the use of cyclic prefixes between the preamble resource elements 515. That is, in some cases, only the first preamble resource element 515-a of a preamble portion 510 may include a cyclic prefix 520.

In some cases, the last preamble resource element 515-b in the preamble portion 510 may include a guard time (GT) 540. A guard time 540 may be a short time interval that provides a buffer between the last preamble resource element 515-b and the first payload resource element 530-a to reduce the likelihood of inter-symbol interference.

Figure 6:
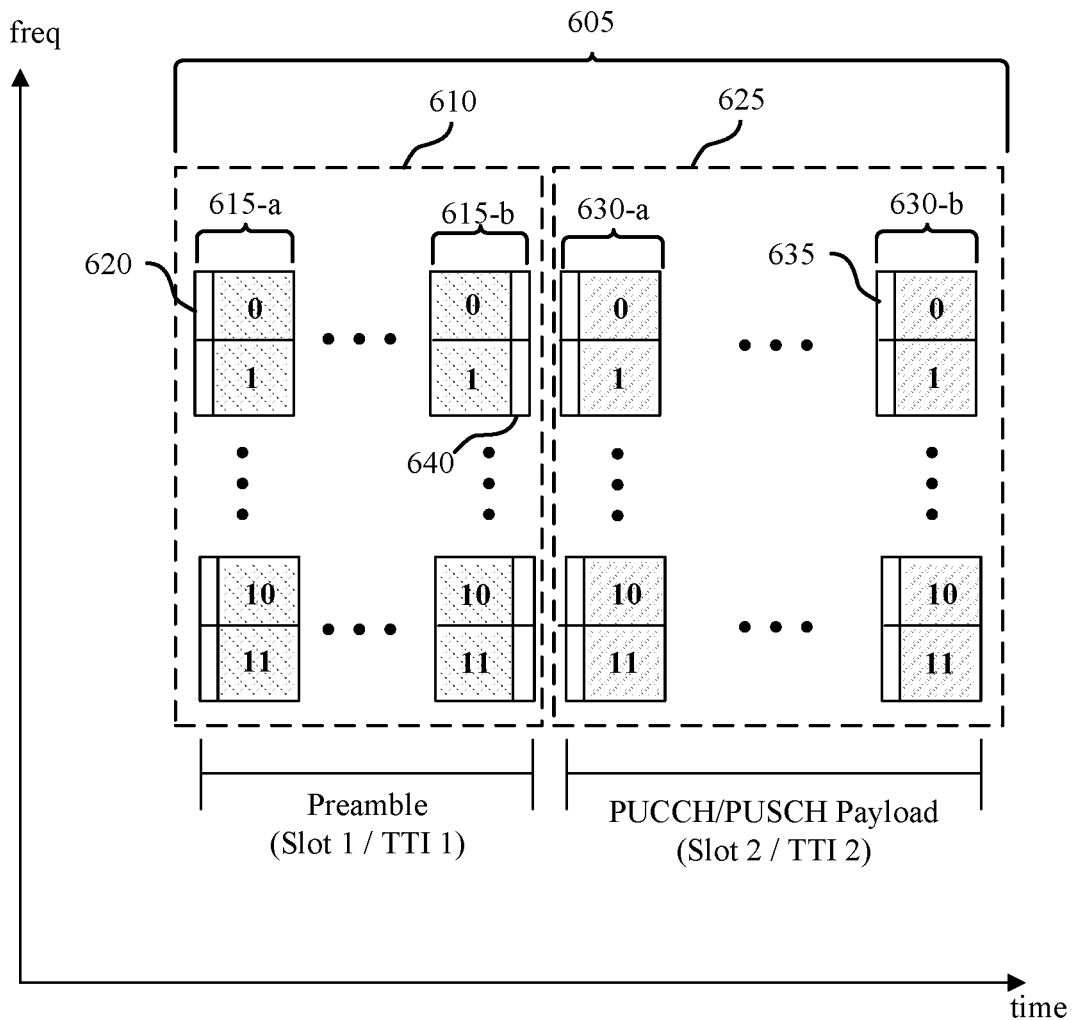
FIG. 6 illustrates an example of a message configuration for message 1 of a two-step random access procedure in accordance with aspects of the present disclosure.

FIG. 6 illustrates an example of a message configuration 600 for an uplink request message of a two-step random access procedure in accordance with aspects of the present disclosure. In some examples, an uplink request message having message configuration 600 may be transmitted using aspects of wireless communication system 100. Message configuration 600 may depict an example of a message configuration that may provide backward-compatibility with the four-message random access procedure, as described herein.

Message configuration 600 includes uplink request message 605, which may be transmitted by a UE 210 to a base station 205 as described with respect to FIG. 2. Uplink request message 605 may include a preamble portion 610 and a payload portion 625. In some cases, the uplink request message 605 may be transmitted using interlaces. In some cases, the uplink request message 605 may be transmitted without using interlaces.

In some cases, the first preamble resource element 615-a in the preamble portion 610 may include a preamble cyclic prefix 620, and the subsequent preamble resource elements may be transmitted without the use of preamble cyclic prefixes 620 between the preamble resource elements 615. That is, in some cases, only the first preamble resource element 615-a of a preamble portion 610 may include a preamble cyclic prefix 620. In some cases, the last preamble resource element 615-b in the preamble portion 610 may include a guard time (GT) 640.

In some cases, it may be desirable for a communication system to support both two-step random access procedures and four-step random access procedures, by, for example, using the same physical RACH (PRACH) configuration for both types of procedures. In some cases, such as in NR, the PRACH configuration index may determine the RACH occasion (RO) (e.g., a transmission occasion during which a UE may transmit information) in the time domain. In some cases, the general PRACH configuration may be kept the same for the two-step procedure and four-step procedure, with the addition of an indication of the association between the preamble portion (e.g., the sequence) and the PUCCH/PUSCH resources allocated for transmission of the payload portion when the two-step random access procedure is used. That is, in some cases, a base station 205 may indicate, to the UE 210, an association between a preamble and a payload resource (e.g., a PUCCH or PUSCH resource) for each RACH occasion.

The base station 205 may signal the association between the preamble and the PUCCH/PUSCH resources in remaining minimum system information (RMSI) transmitted by the base station 205 to the UE 210. In this case, the PUCCH/PUSCH may be transmitted on a separate TTI (e.g., slot, mini-slot, resource element) than the preamble. That is, in some cases, message configuration 600 may provide better compatibility with a four-step RACH procedure by transmitting the preamble portion 610 of uplink request message 605 during a first TTI (e.g., a slot) and transmitting the payload portion 625 during a second TTI.

In some cases, the preamble portion 610 and the payload portion 625 may be transmitted with an intervening TTI;

e.g., there may be a third TTI that is between the first TTI and the second TTI. In some cases, the intervening TTI may be available for non-RACH transmissions.

In some cases, the UE 210 may perform a first LBT procedure before transmitting the preamble portion 610 in the first TTI, and, because there is an intervening TTI during which the resources may be used by another UE, UE 210 may perform a second LBT procedure before transmitting the payload portion 625 in the second TTI. In some cases, the additional LBT procedure may introduce undesirable latency in the RACH procedure.

In some cases, however, a base station 205 may use the intervening TTI to perform a downlink transmission, thereby occupying the resources during the intervening TTI. In this case, the UE 210 may refrain from performing another LBT procedure before transmitting the payload portion 625 of the uplink request message 605, thereby potentially reducing the latency of the RACH procedure and enabling a more efficient use of resources.

In some cases, a base station 205 may overprovision resources for the payload portion 625 to ensure that sufficient resources are available to accommodate potentially large payload sizes. However, in some cases, resources that have been provisioned by base station 205 for a preamble nay not be used; for example, a UE 210 may not use an allocated preamble resource to initiate a RACH procedure. In this case, the corresponding payload resource may also be unused.

In some cases, if there is a gap (e.g., an intervening TTI) between the preamble portion 610 and the payload portion 625, a base station 205 may use DMRS detection in the preamble portion 610 to schedule (e.g., re-allocate) some of the corresponding payload portion 625 resources for which no preamble has been received (e.g., in the case when a UE does not initiate a RACH procedure on the preamble resource). In some cases, the base station 205 need only determine whether a UE 215 has transmitted or not. In some cases, a base station 205 may have a fairly short amount of time in which to reschedule the resources. If the base station 205 can process in a limited fashion due to smaller processing time, the base station 205 can schedule some other UEs only on the resources it can process.

The payload resources may or may not fully overlap with the preamble resources. For example, preambles on one interlace may correspond to the payload dimension across more than one interlace. In some cases, if a preamble portion overlaps a payload portion in frequency, then the preamble portion may be used as a DMRS for the payload portion. In some cases, as shown in FIG. 6, the preamble portion 610 may not overlap the payload portion 625 in frequency. In this case, the payload portion 625 may include an embedded DMRS that matches the dimension (e.g., the size or number of resource elements 615, 630) of the preamble portion 610 and/or the payload portion 625.

In some cases, a first portion of the set of predefined sequences may be associated with two-step RACH procedures, and a second portion of the set of predefined sequences may be associated with four-step RACH procedures. For example, if the set of sequences includes 64 sequences, the first portion may include 16 of the sequences that are associated with the two-step procedure, and the second portion may include 48 of the sequences that are associated with the four-step procedure. Other partitionings are possible.

In this case, a UE 210 may be configured (e.g., using RMSI) to select a preamble sequence (e.g., a sequence to be included in the preamble portion) from the first portion of the set of predefined sequences to perform a two-step RACH procedure, and the UE 210 may be configured to select a preamble sequence from the second portion of the set of predefined sequences to perform a four-step RACH procedure. In this manner, the preamble sequence may be used to indicate which random access procedure (two-step or four-step) will be used.

In some cases, sequences that are included in the first portion of sequences may be associated with two-step PUSCH/PUCCH resources, and sequences that are included in the second portion of sequences may be associated with (different) four-step PUSCH/PUCCH resources.

In some cases, a preamble sequence may have a 1:1 correspondence with a payload resource, such that a single preamble sequence may be mapped to specific payload resources. In some cases, however, it may be possible to map multiple preamble sequences into the same payload (PUCCH/PUSCH) resource such that a preamble sequence shares a resource association with another preamble sequence. For example, preamble sequence 1 and sequence 2 may be mapped to the same PUSCH resource. In this case, a base station 205 may use additional information to distinguish between the two preamble sequences. In some cases, different preamble sequences may be associated with different DMRS ports (e.g., different antenna ports used to transmit the DMRS signal), or to different scrambling identifiers (for both the DMRS and/or for transmission of the payload portion). In this case, a base station 205 may use space division multiple access (SDMA) techniques to separate sequence 1 and sequence 2. In some cases, a UE 210 may apply an additional differentiating factor, such as a different DMRS port or a different scrambling identifier, to the uplink request message to allow differentiation of the payload portion of the uplink request message. In some cases, a UE 210 may apply an additional identifying factor, such as a different DMRS port or a different scrambling identifier, to the uplink request message to allow identification of the payload portion of the uplink request message.

In some cases, UEs 210 can further hash into (e.g., index) the multiple payload resources/multiple DMRS ports/multiple scrambling IDs when multiple UEs 210 select the same preamble sequence. In some cases, this approach may help reduce collisions of transmissions from multiple UEs 210 when the same preamble sequence is selected by multiple UEs 210.

Figure 7:
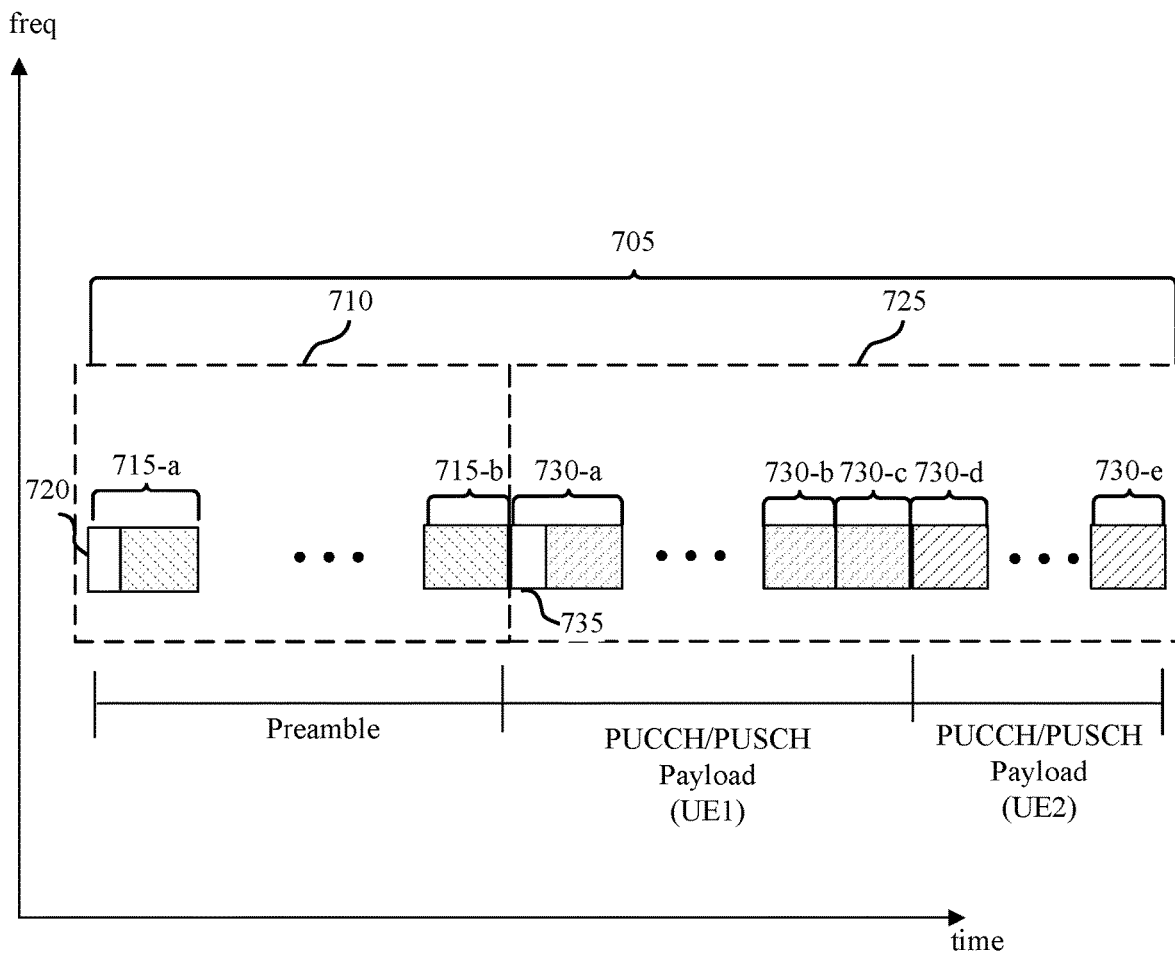
FIG. 7 illustrates an example of a message configuration for message 1 of a two-step random access procedure in accordance with aspects of the present disclosure.

FIG. 7 illustrates an example of a message configuration 700 for an uplink request message of a two-step random access procedure in accordance with aspects of the present disclosure. In some examples, an uplink request message having message configuration 700 may be transmitted using aspects of wireless communication system 100.

In some cases, message configurations 300, 400, 500, and 600 may be examples of message configurations that may support a two-step RACH procedure when the UE 210 may use a relatively small timing advance (TA), such as for communications within relatively small cells with correspondingly small TAs. A TA may be an offset (e.g., an amount of time) that may be used to account for transmission time delays between a UE 210 and a base station 205 and thereby maintain synchronization of downlink and uplink transmissions. In some cases, if a cell is sufficiently small (as may be, for example, in NR systems), the TA may also be small, and may be covered (e.g., spanned) by the CP of the preamble portion of an uplink request message.

In some cases, however, the TA may be larger (or much larger) than the CP. Message configuration 700 may depict an example of a message configuration that may support a two-step RACH procedure when the UE 210 may use a relatively large TA. In this case, the UE 210 may transmit an uplink request message that includes a payload portion that is transmitted in a time-domain waveform and TDM-multiplexed with payloads for different UEs 210.

For example, message configuration 700 includes uplink request message 705, which may be transmitted by a UE 210 to a base station 205 as described with respect to FIG. 2. Uplink request message 705 may include a preamble portion 710 and a payload portion 725.

In some cases, the first preamble resource element 715-*a* in the preamble portion 710 includes a preamble cyclic prefix 720, and the subsequent preamble resource elements 715 may be transmitted with or without the use of preamble cyclic prefixes 720 between the preamble resource elements 715. In some cases, cyclic prefix 720 may cover (e.g., span) the TA to allow preamble timing and channel estimation in the frequency domain.

In some cases, payload portion 725 includes payload resource elements 730-*a* through 740-*c*, each of which may or may not include a corresponding payload cyclic prefix 735; e.g., payload cyclic prefix 735 may be optional. Payload portion 725 may include payload resource elements for a first UE (e.g., payload resource elements 730-*a* through 730-*c*) TDM multiplexed with payload resource elements for a second UE (e.g., payload resource elements 730-*d* through 730-*e*). In some cases, payload resource elements 730-*d* through 730-*e* for the second UE may not include payload cyclic prefixes. In some cases, payload resource elements 730-*a* through 730-*c* and payload resource elements 730-*d* through 730-*e* may include an embedded DMRS for their respective payload.

Figure 8:
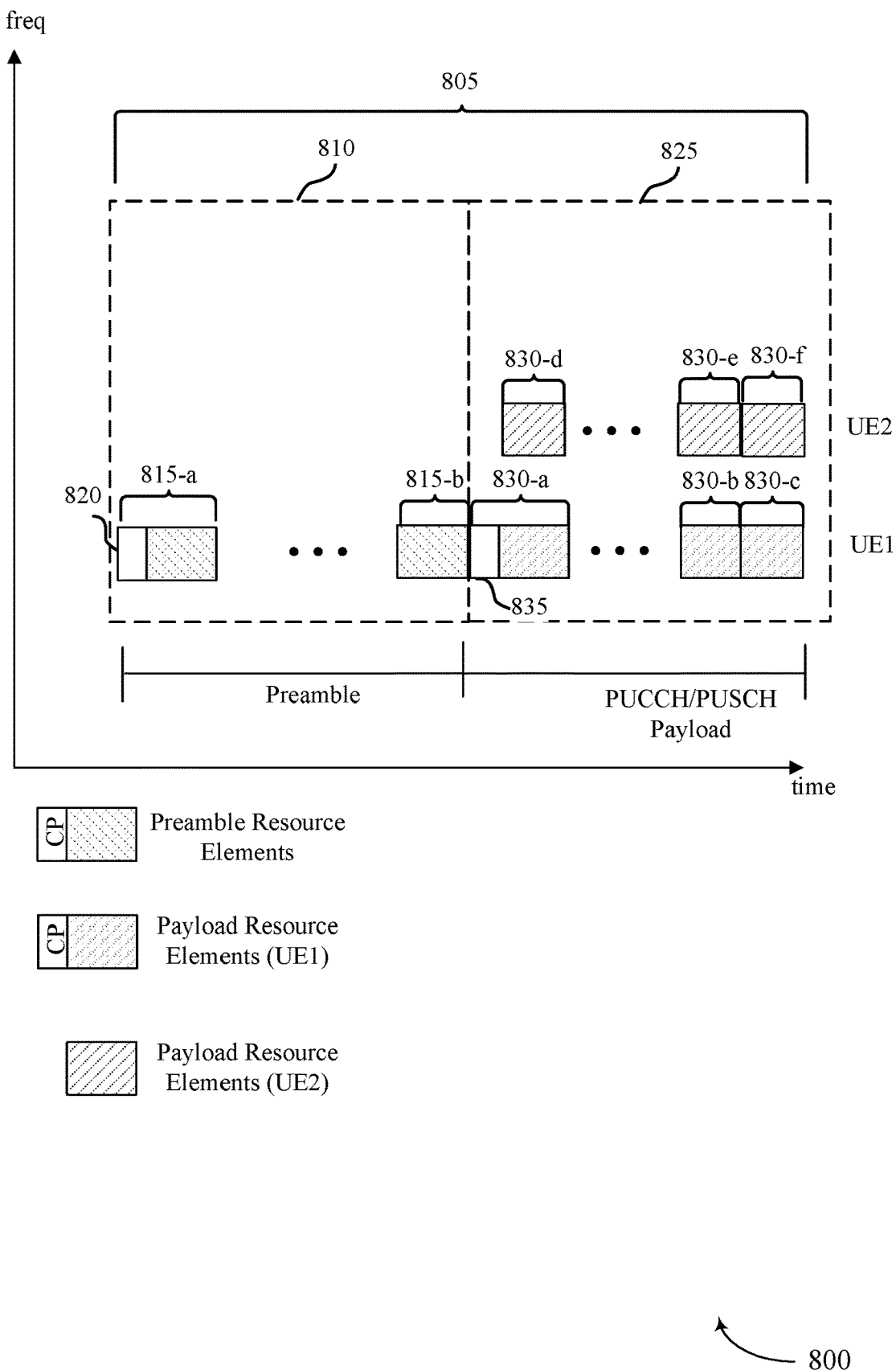
FIG. 8 illustrates an example of a message configuration for message 1 of a two-step random access procedure in accordance with aspects of the present disclosure.

FIG. 8 illustrates an example of a message configuration 800 for an uplink request message of a two-step random access procedure in accordance with aspects of the present disclosure. In some examples, an uplink request message having message configuration 800 may be transmitted using aspects of wireless communication system 100. Message configuration 800 may depict an example of a message configuration that may support a two-step RACH procedure when the UE 210 may use a relatively large TA.

Message configuration 800 may be similar to message configuration 700, but in this example, the payload portion may include a time-domain waveform with CDM-multiplexed payloads (rather than TDM-multiplexed payloads) for different UEs 210.

For example, message configuration 800 includes uplink request message 805, which may be transmitted by a UE 210 to a base station 205 as described with respect to FIG. 2. Uplink request message 805 may include a preamble portion 810 and a payload portion 825.

In some cases, the first preamble resource element 815-*a* in the preamble portion 810 includes a preamble cyclic prefix 820, and the subsequent preamble resource elements 815 may be transmitted with or without the use of preamble cyclic prefixes 820 between the preamble resource elements 815. In some cases, preamble cyclic prefix 820 may cover (e.g., span) the TA to allow preamble timing and channel estimation in the frequency domain.

In some cases, payload portion 825 includes payload resource elements 830, each of which may or may not include a payload cyclic prefix 835. Payload portion 825 may include payload resource elements for a first UE (e.g., payload resource elements 830-*a* through 830-*c*) CDM multiplexed with payload resource elements for a second UE (e.g., payload resource elements 830-*d* through 830-*f*). In some cases, payload resource elements 830-*a* through 830-*c* and payload resource elements 830-*d* through 830-*f* may include a DMRS for the respective payload. In some cases, the payload and the DMRS in the payload portion 825 may also be CDM multiplexed using a different spreading code.

Figure 9:
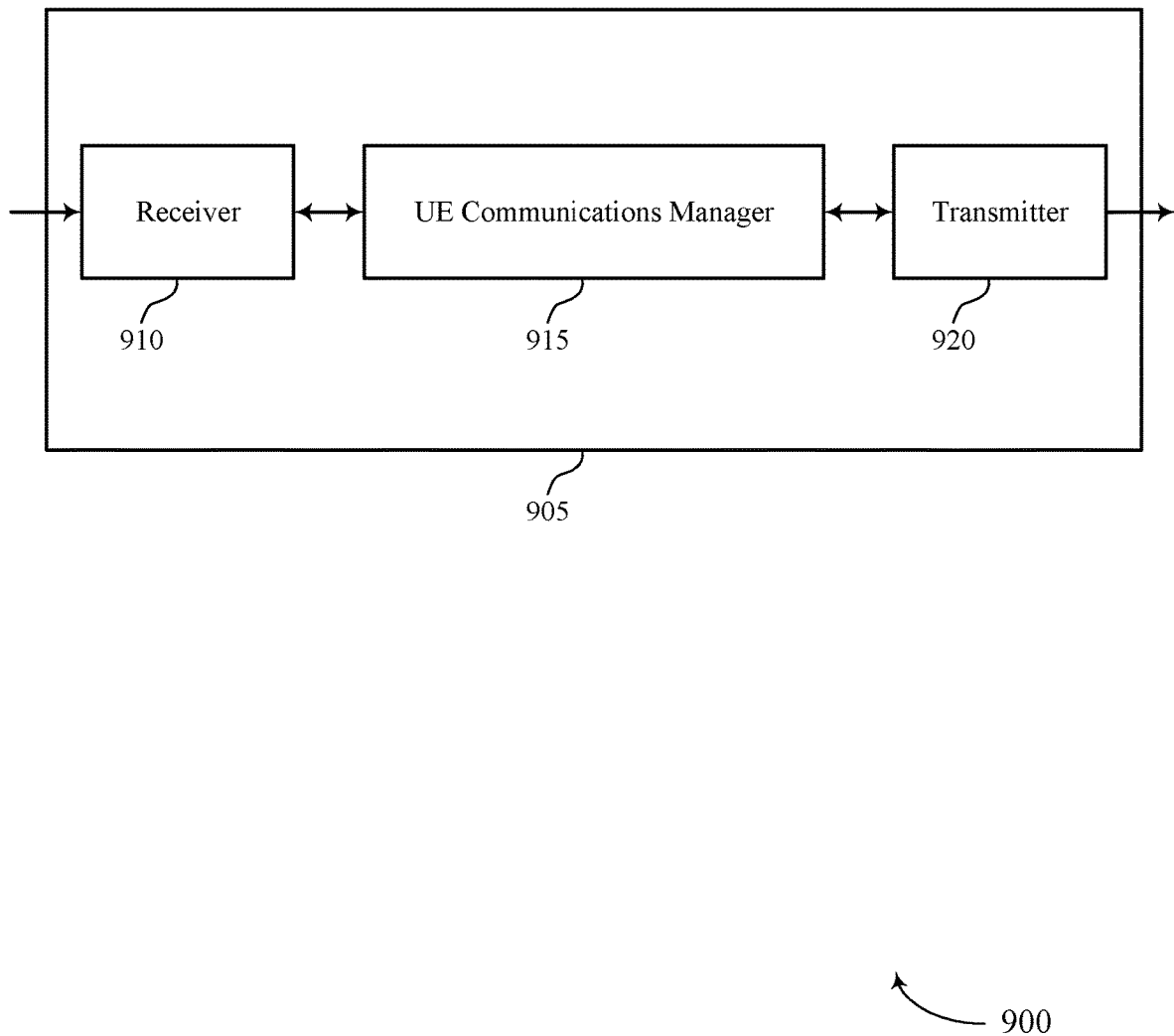
FIGS. 9 and 10 show block diagrams of devices that support message 1 of a two-step random access procedure in accordance with aspects of the present disclosure.

FIG. 9 shows a block diagram 900 of a device 905 that supports message 1 of a two-step random access procedure in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to message 1 of a two-step random access procedure, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may identify that the UE is configured to use a two-step RACH procedure, the two-step RACH procedure including an uplink request message and a downlink response. The UE communications manager 915 may transmit the uplink request message as part of the two-step RACH procedure, the uplink request message including a preamble portion that is one of a set of predefined sequences and a payload portion that includes a physical uplink shared channel waveform, where the preamble portion is associated with a transmission occasion of the PUSCH. The UE communications manager 915 may receive the downlink response as part of the two-step RACH procedure and in response to the uplink request message. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
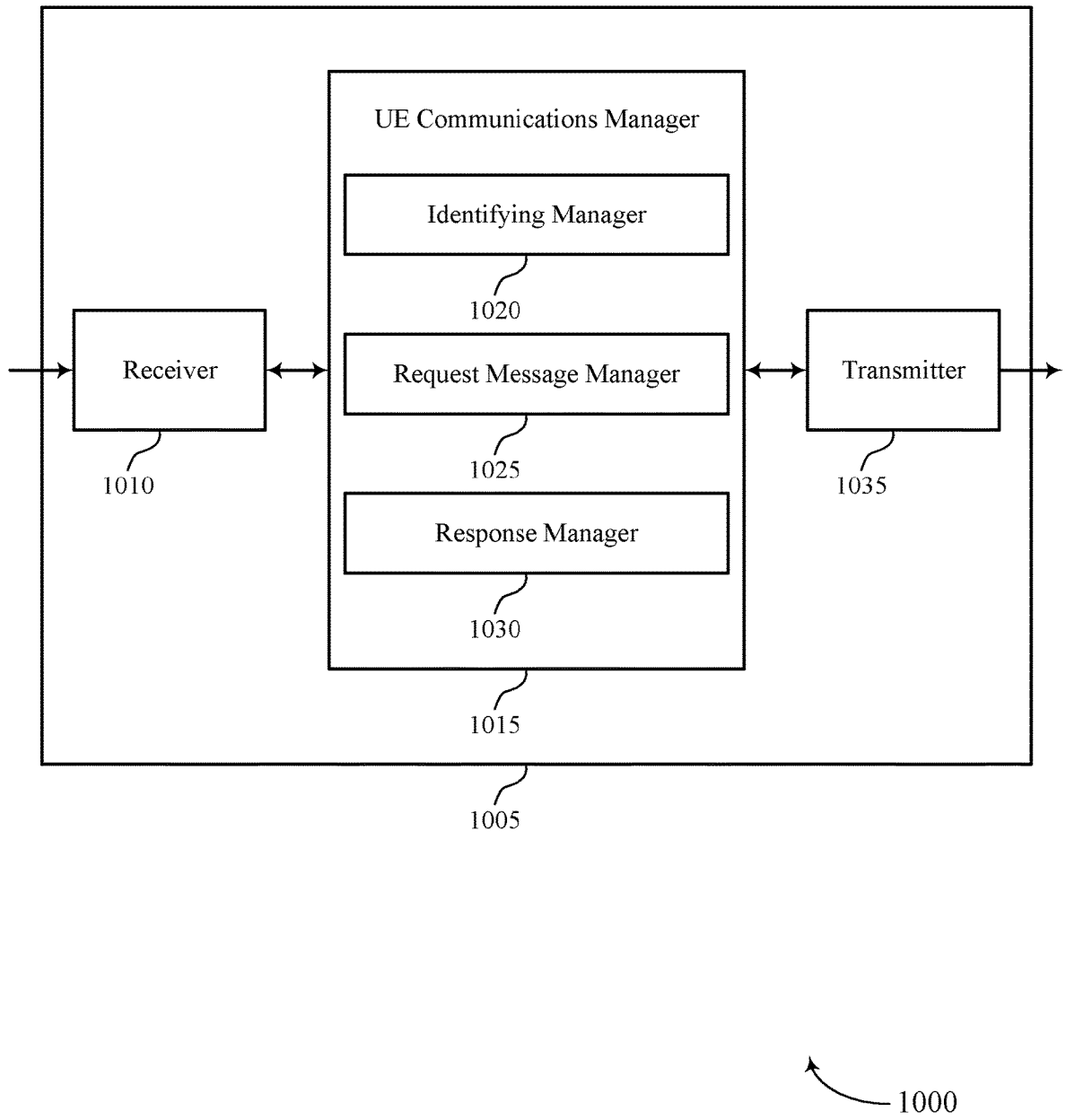

FIG. 10 shows a block diagram 1000 of a device 1005 that supports message 1 of a two-step random access procedure in accordance with aspects of the present disclosure. The device 1005 may be an example of aspects of a device 905, or a UE 115 as described herein. The device 1005 may include a receiver 1010, a UE communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to message 1 of a two-step random access procedure, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include an identifying manager 1020, a request message manager 1025, and a response manager 1030. The UE communications manager 1015 may be an example of aspects of the UE communications manager 1210 described herein.

The identifying manager 1020 may identify that the UE is configured to use a two-step RACH procedure, the two-step RACH procedure including an uplink request message and a downlink response.

The request message manager 1025 may transmit the uplink request message as part of the two-step RACH procedure, the uplink request message including a preamble portion that is one of a set of predefined sequences and a payload portion that includes a waveform of a physical uplink shared channel, where the preamble portion is associated with a transmission occasion of the physical uplink shared channel.

The response manager 1030 may receive the downlink response as part of the two-step RACH procedure and in response to the uplink request message.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
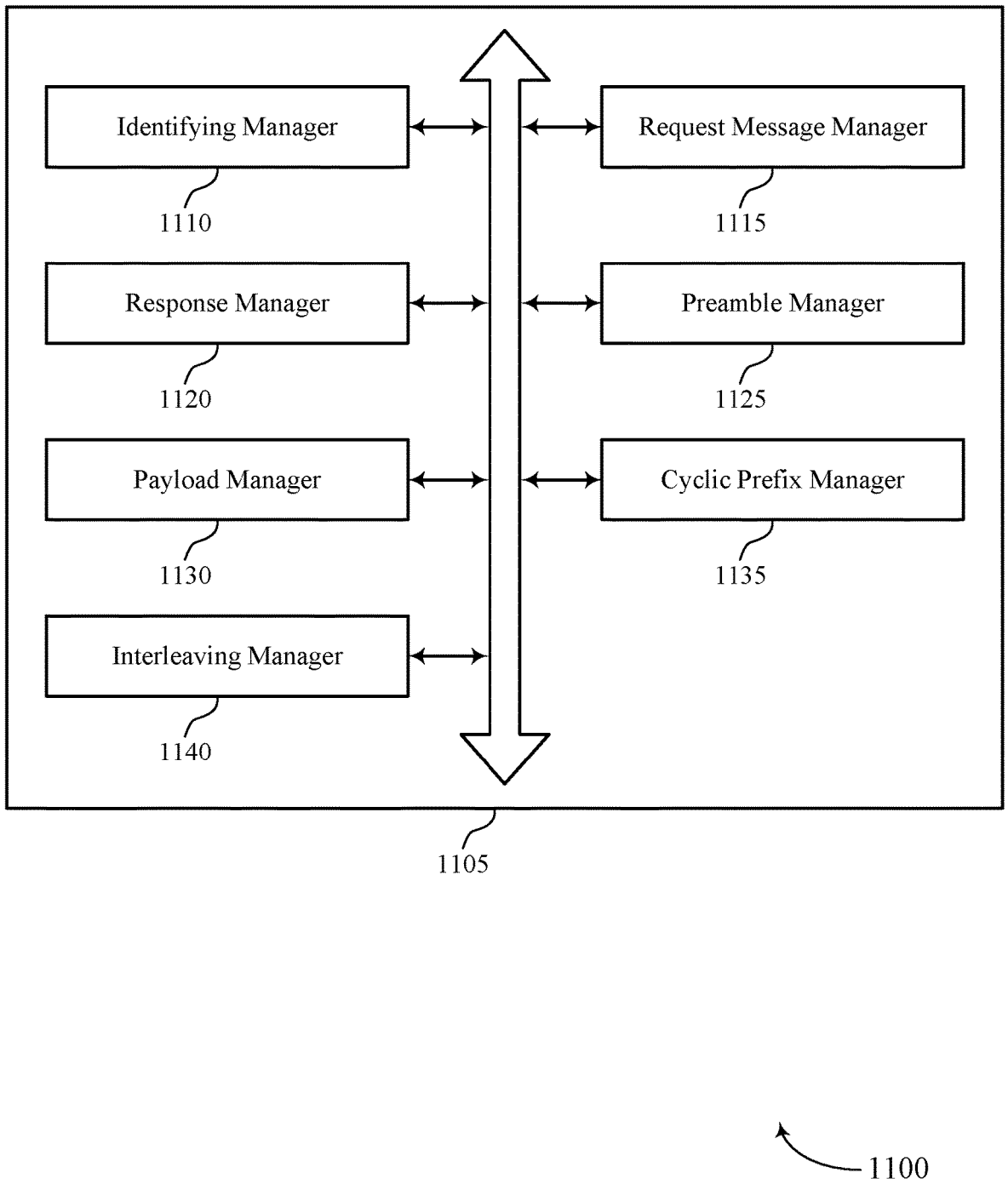
FIG. 11 shows a block diagram of a communications manager that supports message 1 of a two-step random access procedure in accordance with aspects of the present disclosure.

FIG. 11 shows a block diagram 1100 of a UE communications manager 1105 that supports message 1 of a two-step random access procedure in accordance with aspects of the present disclosure. The UE communications manager 1105 may be an example of aspects of a UE communications manager 915, a UE communications manager 1015, or a UE communications manager 1210 described herein. The UE communications manager 1105 may include an identifying manager 1110, a request message manager 1115, a response manager 1120, a preamble manager 1125, a payload manager 1130, a cyclic prefix manager 1135, and an interleaving manager 1140. Each of these modules may communicate, directly or indirectly, with one another (e.g., via one or more buses).

The identifying manager 1110 may identify that the UE is configured to use a two-step RACH procedure, the two-step RACH procedure including an uplink request message and a downlink response.

The request message manager 1115 may transmit the uplink request message as part of the two-step RACH procedure, the uplink request message including a preamble portion that is one of a set of predefined sequences and a payload portion that includes waveform of a physical uplink shared channel, where the preamble portion is associated with a transmission occasion of the physical uplink shared channel.

In some examples, the request message manager 1115 may transmit the preamble portion of the uplink request message as a demodulation reference signal for the payload portion of the uplink request message. In some examples, the request message manager 1115 may transmit additional demodulation reference signals for the payload portion of the uplink request message.

In some examples, the request message manager 1115 may receive, via remaining minimum system information or radio resource control signaling, an association between the preamble portion of the uplink request message and the payload portion of the uplink request message.

In some examples, the request message manager 1115 may transmit the preamble portion of the uplink request message and the payload portion of the uplink request message without an intervening transmission time interval between the first transmission time interval and the second transmission time interval. In some examples, the request message manager 1115 may transmit the preamble portion of the uplink request message and the payload portion of the uplink request message with an intervening transmission time interval between the first transmission time interval and the second transmission time interval, where the intervening transmission time interval is available for non-RACH transmissions.

In some examples, the request message manager 1115 may apply an additional differentiating factor to the uplink request message to allow differentiation of the payload portion of the uplink request message. In some examples, the request message manager 1115 may apply an additional identifying factor to the uplink request message to allow identification of the payload portion of the uplink request message. In some cases, the additional differentiating factor is one or more of use of different demodulation reference signal ports or use of different scrambling identifications. In some cases, the additional identifying factor is one or more of use of different demodulation reference signal ports or use of different scrambling identifications.

The response manager 1120 may receive the downlink response as part of the two-step RACH procedure and in response to the uplink request message.

The preamble manager 1125 may transmit the preamble portion of the uplink request message using a preamble sequence that has a prime number sequence length.

In some examples, the preamble manager 1125 may transmit the preamble portion of the uplink request message back-to-back with the payload portion of the uplink request message, each resource element of the preamble portion and each resource element of the payload portion having a cyclic prefix. In some examples, the preamble manager 1125 may transmit the preamble portion of the uplink request message back-to-back with the payload portion of the uplink request message without use of cyclic prefixes between resource elements of the preamble portion. In some examples, the preamble manager 1125 may transmit the preamble portion of the uplink request message during a first transmission time interval.

In some examples, the preamble manager 1125 may select a preamble sequence from the set of predefined sequences for transmission of the preamble portion of the uplink request message, where only a portion of the predefined sequences are associated with two-step RACH procedures. In some examples, the preamble manager 1125 may select a preamble sequence from the set of predefined sequences for transmission of the preamble portion of the uplink request message, where the selected preamble sequence shares a resource association with another preamble sequence of the set of predefined sequences. In some examples, the preamble manager 1125 may select a preamble sequence from the set of predefined sequences for transmission of the preamble portion of the uplink request message, where the selected preamble sequence has a resource association with more than one payload resource.

In some examples, the preamble manager 1125 may receive an indication of the preamble portion.

The payload manager 1130 may transmit the payload portion using resource elements that are a subset of a frequency span of the preamble portion.

In some examples, the payload manager 1130 may transmit the payload portion using a payload size that is based, at least in part, on whether the two-step RACH procedure is for initial access or for handover. In some examples, the payload manager 1130 may transmit the payload portion using a fixed payload size. In some examples, the payload manager 1130 may transmit, in accordance with the received association, the payload portion of the uplink request message during a second transmission time interval.

In some examples, the payload manager 1130 may transmit the payload portion of the uplink request message with an embedded demodulation reference signal to match dimensions of both the preamble portion and the payload portion. In some examples, the payload manager 1130 may transmit the payload portion during a time resource that is time-multiplexed with payload portions from additional UEs. In some examples, the payload manager 1130 may transmit the payload portion during a time resource that is code division-multiplexed with payload portions from additional UEs.

The cyclic prefix manager 1135 may generate a cyclic prefix for resource elements in the preamble portion and/or the payload portion.

In some cases, the cyclic prefix of the resource elements of the preamble portion of the uplink request message is different from the cyclic prefix of the resource elements of the payload portion of the uplink request message.

The interleaving manager 1140 may transmit the preamble portion of the uplink request message interleaved in time with the payload portion of the uplink request message, each resource element of the preamble portion and each resource element of the payload portion having a cyclic prefix.

In some cases, the cyclic prefix of the resource elements of the preamble portion of the uplink request message is different from the cyclic prefix of the resource elements of the payload portion of the uplink request message.

Figure 12:
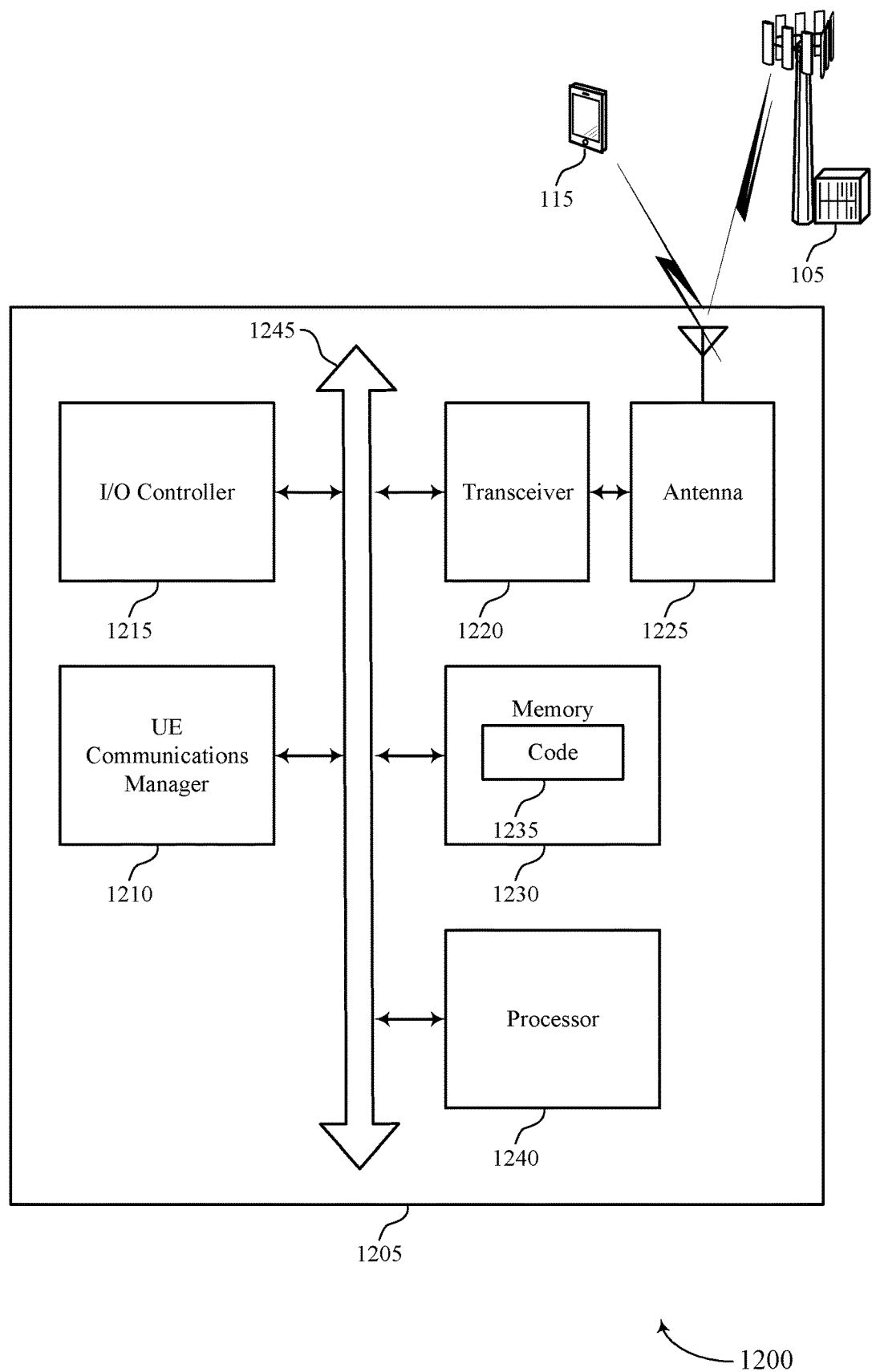
FIG. 12 shows a diagram of a system including a device that supports message 1 of a two-step random access procedure in accordance with aspects of the present disclosure.

FIG. 12 shows a diagram of a system 1200 including a device 1205 that supports message 1 of a two-step random access procedure in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may identify that the UE is configured to use a two-step RACH procedure, the two-step RACH procedure including an uplink request message and a downlink response, transmit the uplink request message as part of the two-step RACH procedure, the uplink request message including a preamble portion that is one of a set of predefined sequences and a payload portion that includes a waveform of a physical uplink shared channel, where the preamble portion is associated with a transmission occasion of the physical uplink shared channel, and receive the downlink response as part of the two-step RACH procedure and in response to the uplink request message.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting message 1 of a two-step random access procedure).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
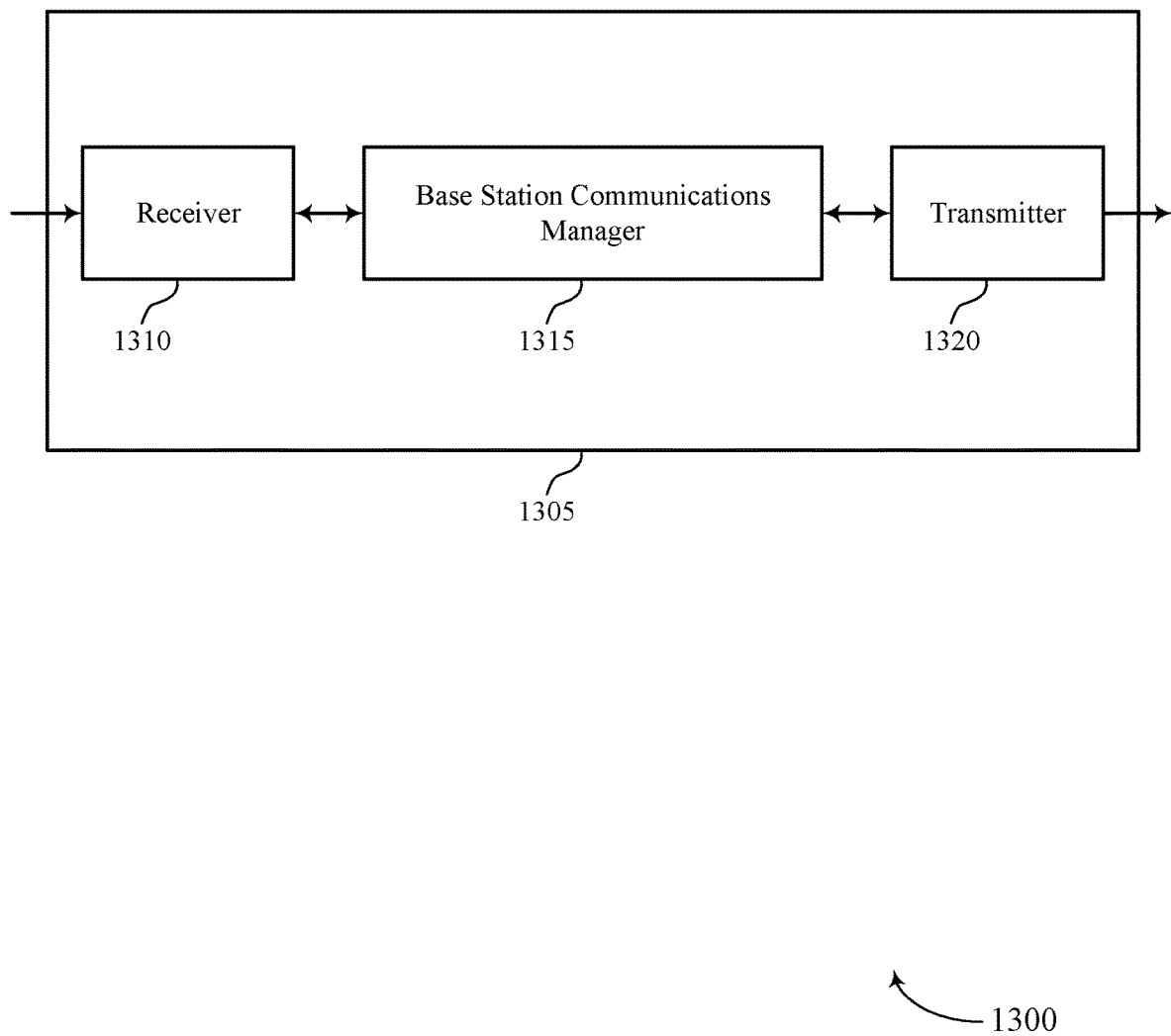
FIGS. 13 and 14 show block diagrams of devices that support message 1 of a two-step random access procedure in accordance with aspects of the present disclosure.

FIG. 13 shows a block diagram 1300 of a device 1305 that supports message 1 of a two-step random access procedure in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to message 1 of a two-step random access procedure, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may receive, as part of a two-step RACH procedure, an uplink request message from a UE, the uplink request message including a preamble portion that is one of a set of predefined sequences and a payload portion that includes a waveform of a physical uplink shared channel, where the preamble portion is associated with a transmission occasion of the physical uplink shared channel, and transmit a downlink response as part of the two-step RACH procedure and in response to the uplink request message. The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
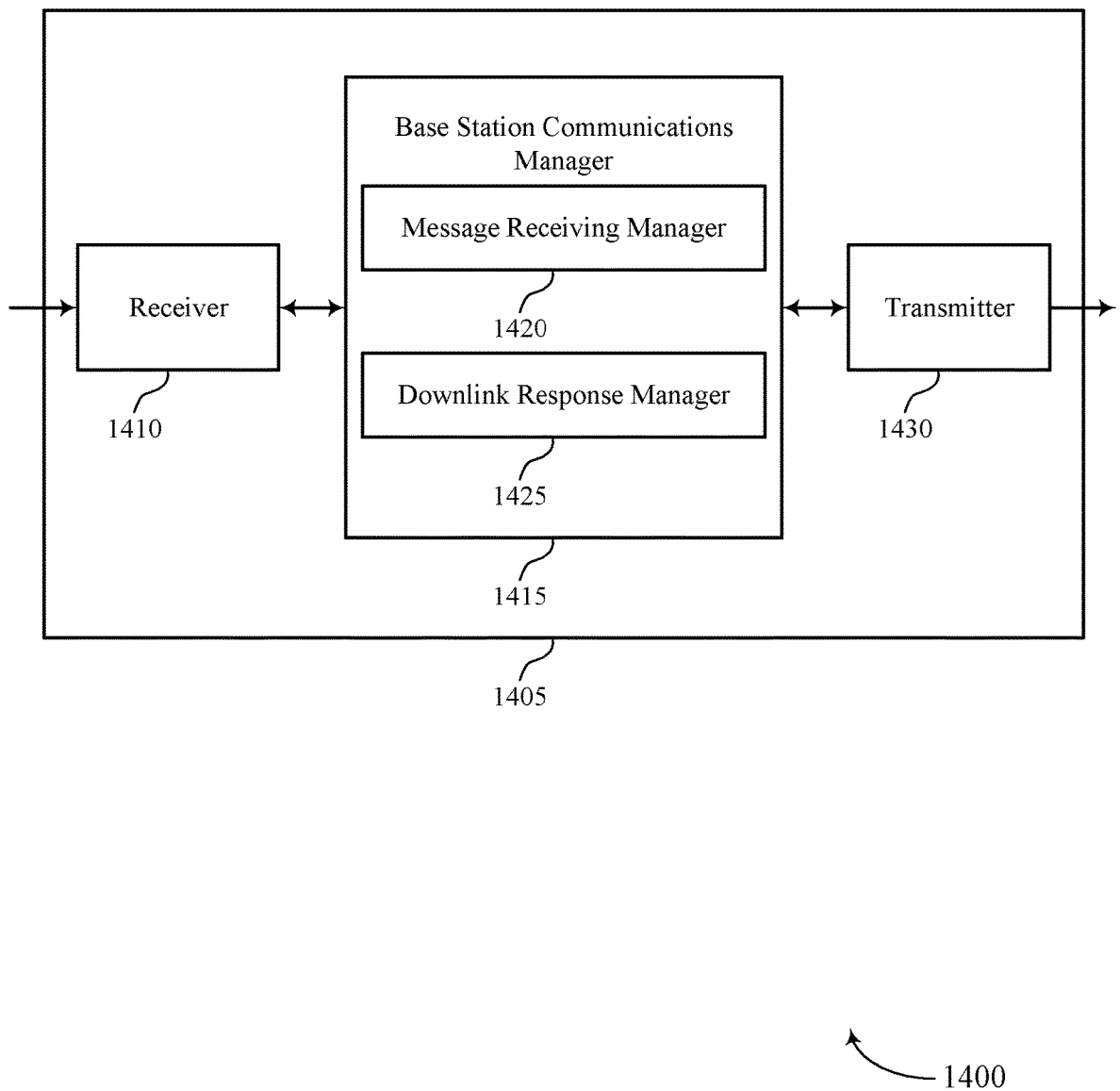

FIG. 14 shows a block diagram 1400 of a device 1405 that supports message 1 of a two-step random access procedure in accordance with aspects of the present disclosure. The device 1405 may be an example of aspects of a device 1305, or a base station 105 as described herein. The device 1405 may include a receiver 1410, a base station communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to message 1 of a two-step random access procedure, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a message receiving manager 1420 and a downlink response manager 1425. The base station communications manager 1415 may be an example of aspects of the base station communications manager 1610 described herein.

The message receiving manager 1420 may receive, as part of a two-step RACH procedure, an uplink request message from a UE, the uplink request message including a preamble portion that is one of a set of predefined sequences and a payload portion that includes a waveform of a physical uplink shared channel waveform, where the preamble portion is associated with a transmission occasion of the physical uplink shared channel.

The downlink response manager 1425 may transmit a downlink response as part of the two-step RACH procedure and in response to the uplink request message.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
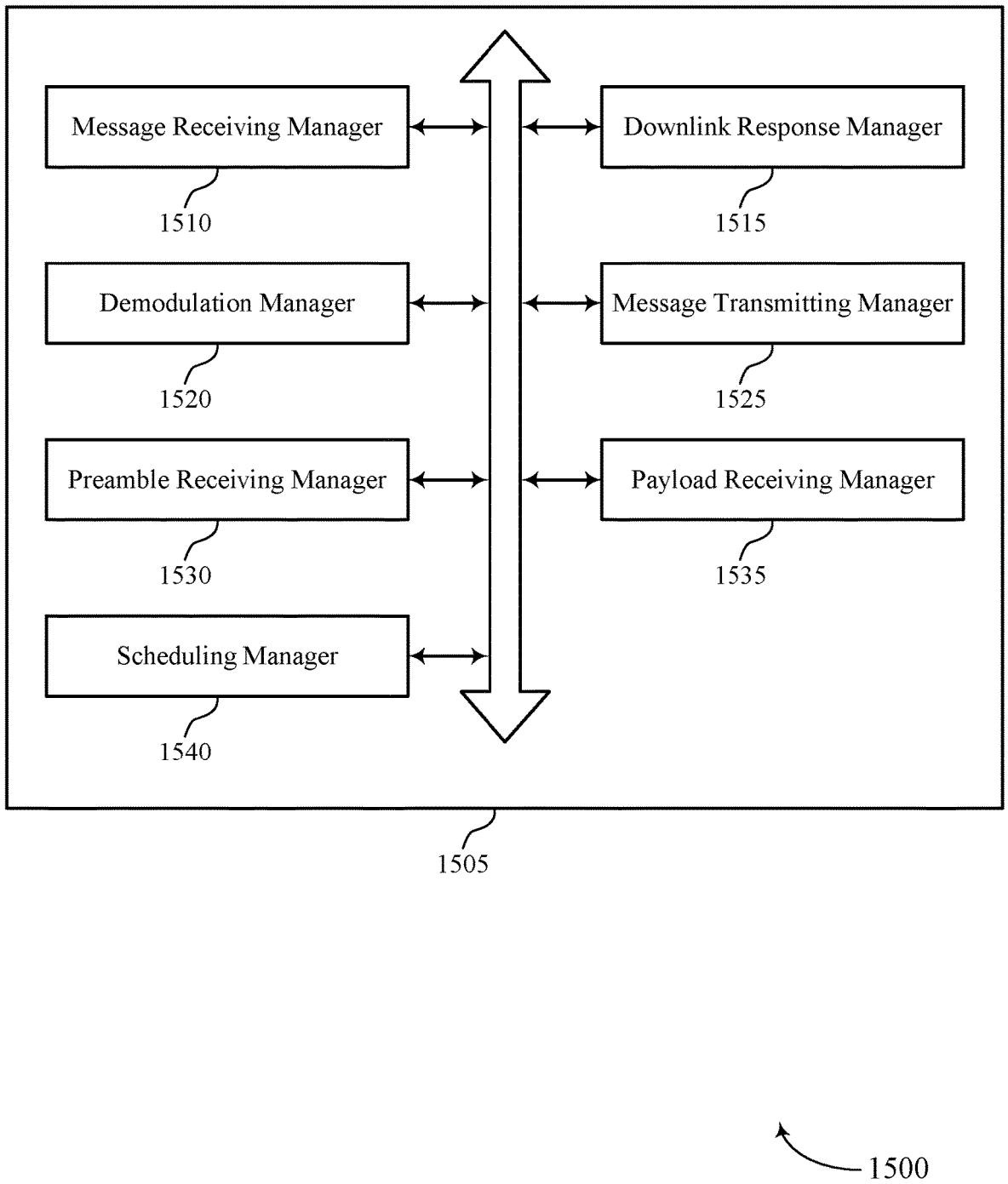
FIG. 15 shows a block diagram of a communications manager that supports message 1 of a two-step random access procedure in accordance with aspects of the present disclosure.

FIG. 15 shows a block diagram 1500 of a base station communications manager 1505 that supports message 1 of a two-step random access procedure in accordance with aspects of the present disclosure. The base station communications manager 1505 may be an example of aspects of a base station communications manager 1315, a base station communications manager 1415, or a base station communications manager 1610 described herein. The base station communications manager 1505 may include a message receiving manager 1510, a downlink response manager 1515, a demodulation manager 1520, a message transmitting manager 1525, a preamble receiving manager 1530, a payload receiving manager 1535, and a scheduling manager 1540. Each of these modules may communicate, directly or indirectly, with one another (e.g., via one or more buses).

The message receiving manager 1510 may receive, as part of a two-step RACH procedure, an uplink request message from a UE, the uplink request message including a preamble portion that is one of a set of predefined sequences and a payload portion that includes a waveform of a physical uplink shared channel, where the preamble portion is associated with a transmission occasion of the physical uplink shared channel.

In some examples, the message receiving manager 1510 may receive the preamble portion of the uplink request message. In some examples, the message receiving manager 1510 may receive the preamble portion of the uplink request message using a preamble sequence that has a prime number sequence length.

In some examples, the message receiving manager 1510 may receive the payload portion using resource elements that are a subset of a frequency span of the preamble portion. In some examples, the message receiving manager 1510 may receive the payload portion using a payload size that is based, at least in part, on whether the two-step RACH procedure is for initial access or for handover. In some examples, the message receiving manager 1510 may receive the payload portion using a fixed payload size.

In some examples, the message receiving manager 1510 may receive the preamble portion of the uplink request message back-to-back with the payload portion of the uplink request message, each resource element of the preamble portion and each resource element of the payload portion having a cyclic prefix. In some examples, the message receiving manager 1510 may receive the preamble portion of the uplink request message interleaved in time with the payload portion of the uplink request message, each resource element of the preamble portion and each resource element of the payload portion having a cyclic prefix. In some examples, the message receiving manager 1510 may receive the preamble portion of the uplink request message back-to-back with the payload portion of the uplink request message without use of cyclic prefixes between resource elements of the preamble portion.

In some examples, the message receiving manager 1510 may receive the preamble portion of the uplink request message during a first transmission time interval. In some examples, the message receiving manager 1510 may receive, in accordance with the association transmitted via remaining minimum system information or radio resource control signaling, the payload portion of the uplink request message during a second transmission time interval. In some examples, the message receiving manager 1510 may receive the preamble portion of the uplink request message and the payload portion of the uplink request message without an intervening transmission time interval between the first transmission time interval and the second transmission time interval. In some examples, the message receiving manager 1510 may receive the preamble portion of the uplink request message and the payload portion of the uplink request message with an intervening transmission time interval between the first transmission time interval and the second transmission time interval, where the intervening transmission time interval is available for non-RACH transmissions.

In some examples, the message receiving manager 1510 may receive in the preamble portion a preamble sequence selected from the set of predefined sequences, where only a portion of the predefined sequences are associated with two-step RACH procedures. In some examples, the message receiving manager 1510 may receive the payload portion of the uplink request message with an embedded demodulation reference signal to match dimensions of both the preamble portion and the payload portion.

In some cases, the cyclic prefix of the resource elements of the preamble portion of the uplink request message is different from the cyclic prefix of the resource elements of the payload portion of the uplink request message.

The downlink response manager 1515 may transmit a downlink response as part of the two-step RACH procedure and in response to the uplink request message.

The demodulation manager 1520 may use the preamble portion of the uplink request message as a demodulation reference signal for the payload portion of the uplink request message.

In some examples, the demodulation manager 1520 may receive additional demodulation reference signals for the payload portion of the uplink request message.

The message transmitting manager 1525 may transmit, via remaining minimum system information or radio resource control signaling, an association between the preamble portion of the uplink request message and the payload portion of the uplink request message.

In some examples, the message transmitting manager 1525 may transmit an indication of the preamble portion.

The preamble receiving manager 1530 may receive in the preamble portion a preamble sequence selected from the set of predefined sequences, where the selected preamble sequence shares a resource association with another preamble sequence of the set of predefined sequences.

In some examples, the preamble receiving manager 1530 may receive in the preamble portion a preamble sequence selected from the set of predefined sequences, where the selected preamble sequence has a resource association with more than one payload resource.

The payload receiving manager 1535 may differentiate the payload portion of the uplink request message via a differentiating factor.

In some examples, the payload receiving manager 1535 may identify the payload portion of the uplink request message via an identifying factor. In some examples, the payload receiving manager 1535 may receive the payload portion during a time resource that is time-multiplexed with payload portions from additional UEs. In some examples, the payload receiving manager 1535 may receive the payload portion during a time resource that is code division-multiplexed with payload portions from additional UEs. In some cases, the identifying factor is one or more of use of different demodulation reference signal ports or use of different scrambling identifications.

In some examples, the payload receiving manager 1535 may apply the preamble portion of the uplink request message as a demodulation reference signal for the payload portion of the uplink request message.

In some cases, the differentiating factor is one or more of use of different demodulation reference signal ports or use of different scrambling identifications.

The scheduling manager 1540 may schedule non-RACH transmissions based on presence of the preamble portion and application of the preamble portion as a demodulation reference signal.

Figure 16:
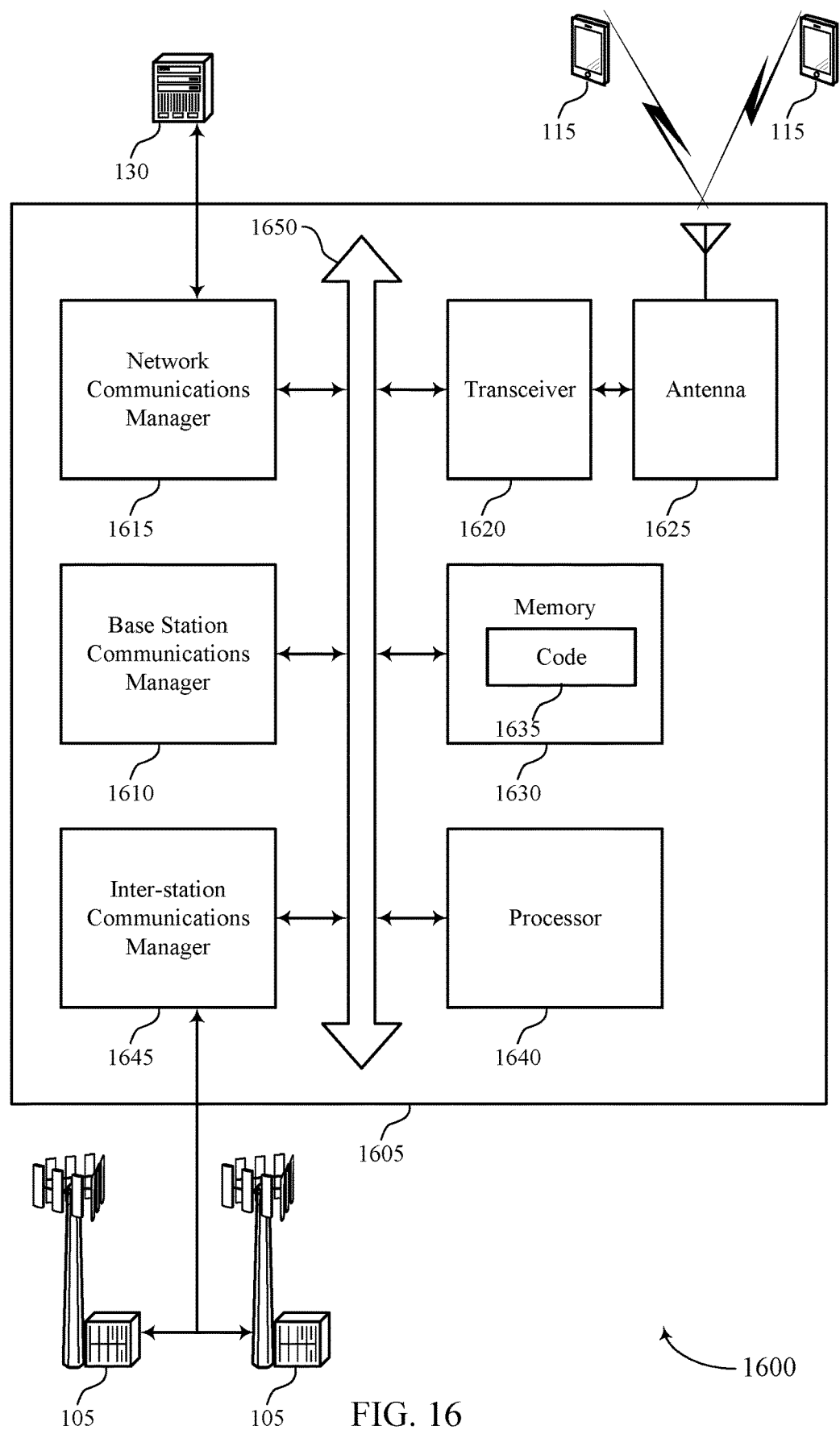
FIG. 16 shows a diagram of a system including a device that supports message 1 of a two-step random access procedure in accordance with aspects of the present disclosure.

FIG. 16 shows a diagram of a system 1600 including a device 1605 that supports message 1 of a two-step random access procedure in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network base station communications manager 1615, a transceiver 1620, an antenna 1625, memory 1630, a processor 1640, and an inter-station base station communications manager 1645. These components may be in electronic communication via one or more buses (e.g., bus 1650).

The base station communications manager 1610 may receive, as part of a two-step RACH procedure, an uplink request message from a UE, the uplink request message including a preamble portion that is one of a set of predefined sequences and a payload portion that includes either a physical uplink control channel waveform or a physical uplink shared channel waveform and transmit a downlink response as part of the two-step RACH procedure and in response to the uplink request message.

The network base station communications manager 1615 may manage communications with the core network (e.g., via one or more wired backhaul links). For example, the network base station communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting message 1 of a two-step random access procedure).

The inter-station base station communications manager 1645 may manage communications with other base station 105, and may include a controller or scheduler for controlling communications with UEs 115 in cooperation with other base stations 105. For example, the inter-station base station communications manager 1645 may coordinate scheduling for transmissions to UEs 115 for various interference mitigation techniques such as beamforming or joint transmission. In some examples, the inter-station base station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
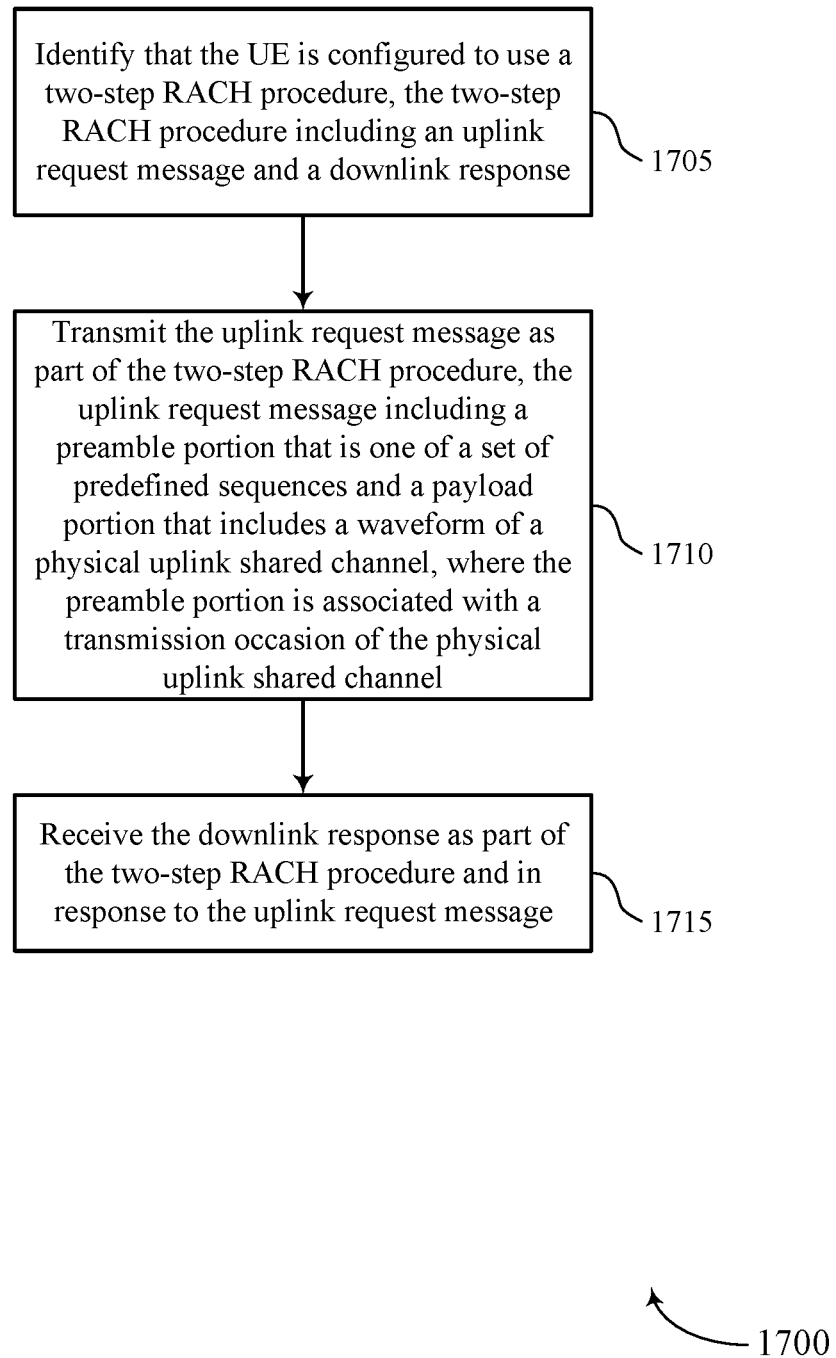
FIGS. 17 and 18 show flowcharts illustrating methods that support message 1 of a two-step random access procedure in accordance with aspects of the present disclosure.

FIG. 17 shows a flowchart illustrating a method 1700 that supports message 1 of a two-step random access procedure in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may identify that the UE is configured to use a two-step RACH procedure, the two-step RACH procedure including an uplink request message and a downlink response. The operations of 1705 may be performed according to the methods described herein. In some examples, aspects of the operations of 1705 may be performed by an identifying manager as described with reference to FIGS. 9 through 12.

At 1710, the UE may transmit the uplink request message as part of the two-step RACH procedure, the uplink request message including a preamble portion that is one of a set of predefined sequences and a payload portion that includes a waveform of a physical uplink shared channel, where the preamble portion is associated with a transmission occasion of the physical uplink shared channel. The operations of 1710 may be performed according to the methods described herein. In some examples, aspects of the operations of 1710 may be performed by a request message manager as described with reference to FIGS. 9 through 12.

At 1715, the UE may receive the downlink response as part of the two-step RACH procedure and in response to the uplink request message. The operations of 1715 may be performed according to the methods described herein. In some examples, aspects of the operations of 1715 may be performed by a response manager as described with reference to FIGS. 9 through 12.

Figure 18:
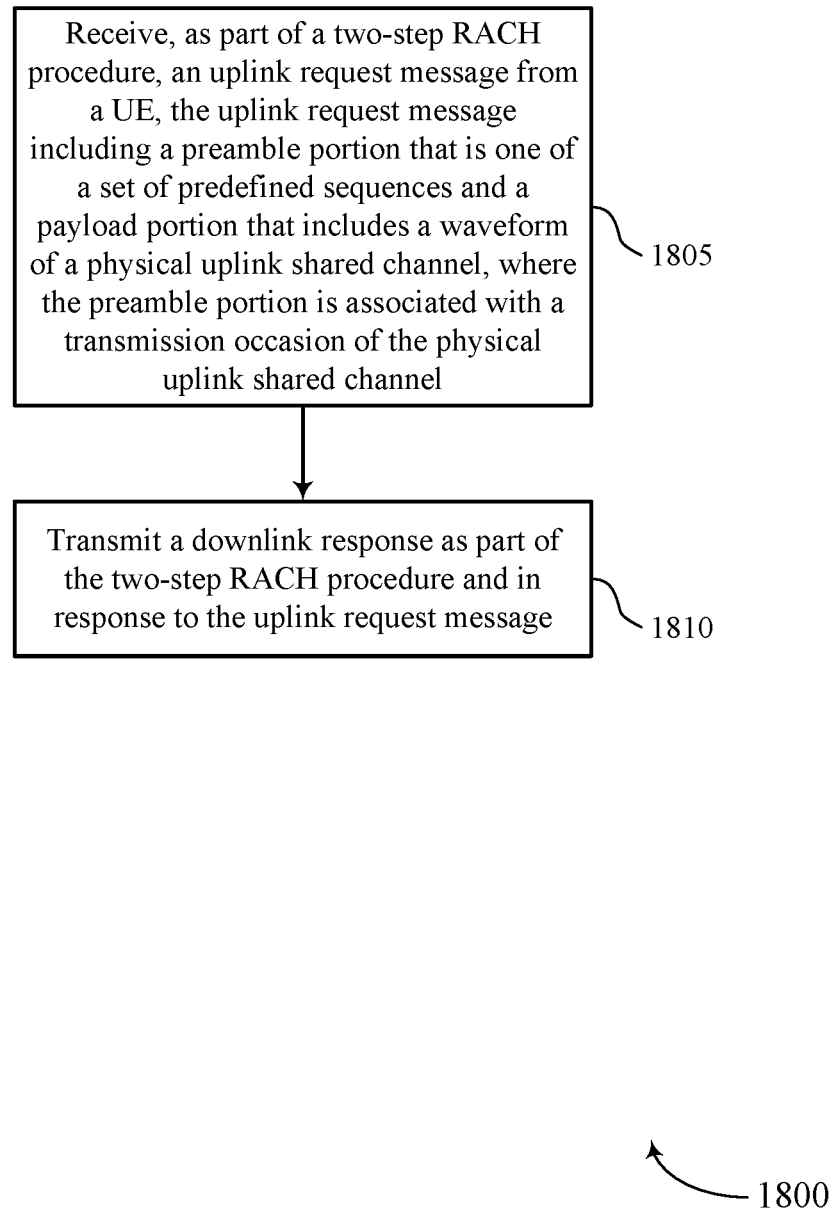

FIG. 18 shows a flowchart illustrating a method 1800 that supports message 1 of a two-step random access procedure in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1805, the base station may receive, as part of a two-step RACH procedure, an uplink request message from a UE, the uplink request message including a preamble portion that is one of a set of predefined sequences and a payload portion that a waveform of a physical uplink shared channel, where the preamble portion is associated with a transmission occasion of the physical uplink shared channel. The operations of 1805 may be performed according to the methods described herein. In some examples, aspects of the operations of 1805 may be performed by a message receiving manager as described with reference to FIGS. 13 through 16.

At 1810, the base station may transmit a downlink response as part of the two-step RACH procedure and in response to the uplink request message. The operations of 1810 may be performed according to the methods described herein. In some examples, aspects of the operations of 1810 may be performed by a downlink response manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples.

A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying that the UE is configured to use a two-step random access channel (RACH) procedure, the two-step RACH procedure including an uplink request message and a downlink response;
   generating a preamble sequence that is one of a set of predefined cyclic sequences associated with two-step RACH procedures;
   transmitting the uplink request message as part of the two-step RACH procedure, in accordance with a message configuration,
      wherein the uplink request message includes a preamble portion comprising a first cyclic prefix and repetitions of the generated preamble sequence in succession with the first cyclic prefix, and
      wherein the uplink request message includes a payload portion that comprises a second cyclic prefix and a physical uplink shared channel associated with a demodulation reference signal (DMRS) and the UE, and
   receiving the downlink response as part of the two-step RACH procedure and in response to the uplink request message.

2. The method of claim 1, further comprising:
   receiving an indication of the preamble portion before transmitting the uplink request message.

3. The method of claim 1, wherein transmitting the uplink request message comprises:
   transmitting the payload portion using a payload size that is based, at least in part, on whether the two-step RACH procedure is for initial access or for handover.

4. The method of claim 1, wherein transmitting the uplink request message comprises:
   transmitting the payload portion using a fixed payload size.

5. The method of claim 1, further comprising:
   receiving a mapping between the generated preamble sequence of the set of predefined cyclic sequences and a transmission occasion for the payload portion; and
   selecting the transmission occasion based on the mapping between the generated preamble sequence of the set of predefined cyclic sequences and the transmission occasion.

6. The method of claim 5, wherein transmitting the uplink request message comprises:
   transmitting the preamble portion of the uplink request message during a first transmission time interval; and
   transmitting, in accordance with the received mapping, the payload portion of the uplink request message during the transmission occasion comprising a second transmission time interval.

7. The method of claim 6, wherein transmitting the uplink request message further comprises:
   transmitting the preamble portion of the uplink request message and the payload portion of the uplink request message without an intervening transmission time interval between the first transmission time interval and the second transmission time interval.

8. The method of claim 6, wherein transmitting the uplink request message further comprises:
   transmitting the preamble portion of the uplink request message and the payload portion of the uplink request message with an intervening transmission time interval between the first transmission time interval and the second transmission time interval, wherein the intervening transmission time interval is available for non-RACH transmissions.

9. The method of claim 1,
wherein the set of predefined cyclic sequences is part of a plurality of predefined sequences, and wherein only a portion of the plurality of predefined sequences are associated with two-step RACH procedures.

10. The method of claim 1,
wherein the generated preamble sequence shares a resource association with another preamble sequence of the set of predefined cyclic sequences, the method further comprising:
applying an additional differentiating factor to the uplink request message to allow differentiation of the payload portion of the uplink request message.

11. The method of claim 10, wherein the additional differentiating factor is one or more of use of different demodulation reference signal ports or use of different scrambling identifications.

12. The method of claim 1, wherein transmitting the uplink request message comprises:
transmitting the payload portion during a time resource that is time-multiplexed with payloads portions from additional UEs.

13. A method for wireless communication at a base station, comprising:
receiving, as part of a two-step random access channel (RACH) procedure, an uplink request message from a user equipment (UE) in accordance with a message configuration,
wherein the uplink request message includes a preamble portion comprising a first cyclic prefix preceding repetitions of a preamble sequence that is one of a set of predefined cyclic sequences associated with two-step RACH procedures, and
wherein the uplink request message includes a payload portion that comprises a second cyclic prefix and a physical uplink shared channel associated with a demodulation reference signal (DMRS) and the UE; and
transmitting a downlink response as part of the two-step RACH procedure and in response to the uplink request message.

14. The method of claim 13, further comprising:
transmitting an indication of the preamble portion to the UE before receiving the uplink request message.

15. The method of claim 13, wherein receiving the uplink request message comprises:
receiving the payload portion using a payload size that is based, at least in part, on whether the two-step RACH procedure is for initial access or for handover.

16. The method of claim 13, wherein receiving the uplink request message comprises:
receiving the payload portion using a fixed payload size.

17. The method of claim 13, further comprising:
transmitting, via radio resource control signaling, a mapping between the preamble sequence of the set of predefined cyclic sequences and a transmission occasion, wherein the preamble sequence indicates the transmission occasion based at least in part on the mapping.

18. The method of claim 17, wherein receiving the uplink request message comprises:
receiving the preamble portion of the uplink request message during a first transmission time interval; and receiving, in accordance with the transmitted mapping, the payload portion of the uplink request message during a second transmission time interval.

19. The method of claim 13, wherein:
the preamble sequence is selected from the set of predefined cyclic sequences, which is part of a plurality of predefined sequences, wherein only a portion of the plurality of predefined sequences are associated with two-step RACH procedures.

20. The method of claim 13, wherein:
the preamble sequence is selected from the set of predefined cyclic sequences, and wherein the selected preamble sequence shares a resource association with another preamble sequence of the set of predefined cyclic sequences, the method further comprising:
differentiating the payload portion of the uplink request message via a differentiating factor.

21. The method of claim 20, wherein the differentiating factor is one or more of use of different demodulation reference signal ports or use of different scrambling identifications.

22. The method of claim 13, wherein:
the preamble sequence is selected from the set of predefined cyclic sequences, and wherein the selected preamble sequence has a resource association with more than one payload resource, the method further comprising:
identifying the payload portion of the uplink request message via an identifying factor.

23. The method of claim 22, wherein the identifying factor is one or more of use of different DMRS ports or use of different scrambling identifications.

24. An apparatus for wireless communication at a user equipment (UE), comprising:
a processor,
memory in electronic communication with the processor; and
instructions stored in the memory and executable by the processor to cause the apparatus to:
identify that the UE is configured to use a two-step random access channel (RACH) procedure, the two-step RACH procedure including an uplink request message and a downlink response;
generate a preamble sequence that is one of a set of predefined cyclic sequences associated with two-step RACH procedures;
transmit the uplink request message as part of the two-step RACH procedure in accordance with a message configuration,
wherein the uplink request message includes a preamble portion comprising a first cyclic prefix and repetitions of the generated preamble sequence in succession with the first cyclic prefix, and
wherein the uplink request message includes a payload portion that comprises a second cyclic prefix and a physical uplink shared channel associated with a demodulation reference signal (DMRS) and the UE; and
receive the downlink response as part of the two-step RACH procedure and in response to the uplink request message.

25. The apparatus of claim 24, wherein the instructions are further executable by the processor to cause the apparatus to:
receive an indication of the preamble portion before transmitting the uplink request message.

26. The apparatus of claim 24, wherein the instructions to transmit the uplink request message are executable by the processor to cause the apparatus to:
transmit the payload portion using a payload size that is based, at least in part, on whether the two-step RACH procedure is for initial access or for handover.

27. The apparatus of claim 24, wherein the instructions to transmit the uplink request message are executable by the processor to cause the apparatus to:
transmit the payload portion using a fixed payload size.

28. The apparatus of claim 24, wherein the instructions are further executable by the processor to cause the apparatus to:
receive a mapping between the generated preamble sequence of the set of predefined cyclic sequences and a transmission occasion for the payload portion; and
select the transmission occasion based on the mapping between the generated preamble sequence of the set of predefined cyclic sequences and the transmission occasion.

29. The apparatus of claim 28, wherein the instructions to transmit the uplink request message are executable by the processor to cause the apparatus to:
transmit the preamble portion of the uplink request message during a first transmission time interval; and
transmit, in accordance with the received mapping, the payload portion of the uplink request message during a second transmission time interval.

30. An apparatus for wireless communication at a base station, comprising:
a processor,
memory in electronic communication with the processor; and
instructions stored in the memory and executable by the processor to cause the apparatus to:
receive, as part of a two-step random access channel (RACH) procedure, an uplink request message from a user equipment (UE) in accordance with a message configuration,
wherein the uplink request message includes a preamble portion comprising a first cyclic prefix preceding repetitions of a preamble sequence that is one of a set of predefined cyclic sequences associated with two-step RACH procedures, and
wherein the uplink request message includes a payload portion that comprises a second cyclic prefix and a physical uplink shared channel associated with a demodulation reference signal (DMRS) and the UE; and
transmit a downlink response as part of the two-step RACH procedure and in response to the uplink request message.

31. The method of claim 1, wherein:
a first preamble resource element of the preamble portion includes the first cyclic prefix;
the first cyclic prefix is not preceded by another cyclic prefix of the preamble portion; and
subsequent preamble resource elements of the preamble portion do not include the first cyclic prefix or another cyclic prefix.

* * * * *